(12) United States Patent
Ma et al.

(10) Patent No.: US 12,375,384 B2
(45) Date of Patent: Jul. 29, 2025

(54) FLOW SUPPRESSION PREDICTION METHOD, ELECTRONIC DEVICE AND STORAGE MEDIUM

(71) Applicant: ZTE CORPORATION, Shenzhen (CN)

(72) Inventors: Zepeng Ma, Shenzhen (CN); Qiaoyan Liu, Shenzhen (CN); Kai Mao, Shenzhen (CN); Jianguo Li, Shenzhen (CN); Ke Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 129 days.

(21) Appl. No.: 18/567,597

(22) PCT Filed: May 23, 2022

(86) PCT No.: PCT/CN2022/094469
§ 371 (c)(1),
(2) Date: Dec. 6, 2023

(87) PCT Pub. No.: WO2022/257743
PCT Pub. Date: Dec. 15, 2022

(65) Prior Publication Data
US 2024/0283728 A1    Aug. 22, 2024

(30) Foreign Application Priority Data

Jun. 11, 2021 (CN) .......................... 202110656628.7

(51) Int. Cl.
*H04L 43/50* (2022.01)
*H04L 41/14* (2022.01)
*H04L 41/147* (2022.01)

(52) U.S. Cl.
CPC ............ *H04L 43/50* (2013.01); *H04L 41/145* (2013.01); *H04L 41/147* (2013.01)

(58) Field of Classification Search
None
See application file for complete search history.

(56) References Cited

U.S. PATENT DOCUMENTS 6,272,110 B1    8/2001   Tunnicliffe et al.
9,756,518 B1    9/2017   Sheen et al.
(Continued)

FOREIGN PATENT DOCUMENTS

CA      3117707 A1      4/2020
WO      2017200651 A1   11/2017

OTHER PUBLICATIONS

Abbas, G., et al. "A State Estimation Based Framework for Control and Management of Data Communication Networks," IEEE First International Conference on Distributed Framework and Applications, Oct. 2008, pp. 194-199.
(Continued)

*Primary Examiner* — Fadi Haj Said
(74) *Attorney, Agent, or Firm* — Vivacqua Crane, PLLC

(57) ABSTRACT

A method for predicting traffic suppression, an electronic device and a storage medium are disclosed. The method may include: determining a traffic value of suppression point according to a preset network traffic model which represents a mapping relationship between a numerical value of a network parameter of a transmission network and a traffic value, wherein the traffic value of suppression point is a traffic threshold of the transmission network under a current running policy; determining a suppression reference value of a target network parameter corresponding to the traffic value of suppression point; and acquiring a parameter prediction value corresponding to the target network parameter, and determining a traffic suppression prediction result according to the parameter prediction value and the suppression reference value.

19 Claims, 12 Drawing Sheets

(56) References Cited

U.S. PATENT DOCUMENTS

| | | |
|---|---|---|
| 2013/0331136 A1 | 12/2013 | Yang et al. |
| 2017/0111233 A1 | 4/2017 | Kokkula et al. |
| 2019/0028537 A1* | 1/2019 | Krishna Singuru .. H04L 67/101 |
| 2019/0246385 A1 | 8/2019 | Lin et al. |
| 2020/0022016 A1* | 1/2020 | Fenoglio ............. H04L 41/5009 |
| 2020/0162336 A1* | 5/2020 | Gonguet ............... H04L 43/067 |
| 2021/0204152 A1* | 7/2021 | Vasudevan ........... G06N 3/0475 |
| 2023/0413312 A1* | 12/2023 | Hata ................... H04W 72/542 |

OTHER PUBLICATIONS

European Patent Office. Extended European Search Report for EP Application No. 22819341.3, mailed Aug. 14, 2024, pp. 1-10.
International Searching Authority. International Search Report and Written Opinion for PCT Application No. PCT/CN2022/094469 and English translation, mailed Jul. 29, 2022, pp. 1-10.

* cited by examiner

FLOW SUPPRESSION PREDICTION METHOD, ELECTRONIC DEVICE AND STORAGE MEDIUM

CROSS-REFERENCE TO RELATED APPLICATION

This application is a national stage filing under 35 U.S.C. § 371 of international application number PCT/CN2022/094469, filed May 23, 2022, which claims priority to Chinese patent application No. 202110656628.7 filed Jun. 11, 2021. The entire contents of these applications are incorporated herein by reference.

TECHNICAL FIELD

The present disclosure relates to, but not limited to, the technical field of wireless communication, and in particular to a method for predicting traffic suppression, an electronic device, and a storage medium.

BACKGROUND

With the development of Internet and communication technologies, wireless networks have become indispensable in daily life and work, bringing huge traffic services to operators. The maximum traffic volume that each cell can achieve is generally limited by the user number, available resources, and software and hardware capabilities. Once the maximum traffic volume is reached, increasing the overheads in response to a traffic demand will not increase the total traffic volume of the cell, but may even lead to a decrease in the traffic volume. This phenomenon is referred to as traffic suppression. However, different cells have different running policies and operational states. At present, there is no means for predicting traffic suppression. In conventional technologies, after occurrence of traffic suppression is detected, a network diagnosis is performed, and then the running policy is adjusted to improve the network status. Such a method is not predictive and affects user experience.

SUMMARY

The following is a summary of the subject matter set forth in this description. This summary is not intended to limit the scope of protection of the claims.

Embodiments of the present disclosure provide a method for predicting traffic suppression, an electronic device, and a storage medium.

In accordance with a first aspect of the present disclosure, an embodiment provides a method for predicting traffic suppression. The method may include: determining a traffic value of suppression point according to a preset network traffic model, where the network traffic model represents a mapping relationship between a numerical value of a network parameter of a transmission network and a traffic value, and the traffic value of suppression point is a traffic threshold of the transmission network under a current running policy; determining a suppression reference value of a target network parameter corresponding to the traffic value of suppression point; and acquiring a parameter prediction value corresponding to the target network parameter, and determining a traffic suppression prediction result according to the parameter prediction value and the suppression reference value. In accordance with a second aspect of the present disclosure, an embodiment provides an electronic device. The device may include: a memory, a processor, and a computer program stored in the memory and executable by the processor, where the computer program, when executed by the processor, causes the processor to implement the method for predicting traffic suppression in accordance with the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

DETAILED DESCRIPTION

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It should be noted that although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a method for predicting traffic suppression, an electronic device, and a storage medium. The method for predicting traffic suppression includes: determining a traffic value of suppression point according to a preset network traffic model which represents a mapping relationship between a numerical value of a network parameter of a transmission network and a traffic value, where the traffic value of suppression point is a traffic threshold of the transmission network under a current running policy; determining a suppression reference value of a target network parameter corresponding to the traffic value of suppression point; and acquiring a parameter prediction value corresponding to the target network parameter, and determining a traffic suppression prediction result according to the parameter prediction value and the suppression reference value. According to the scheme provided in the embodiments of the present disclosure, the traffic suppression prediction result corresponding to the target network parameter can be predicted before traffic suppression occurs, in order to provide a data basis for network optimization in advance and effectively improve user experience.

The embodiments of the present disclosure will be further described in detail below in conjunction with the accompanying drawings.

Figure 1:
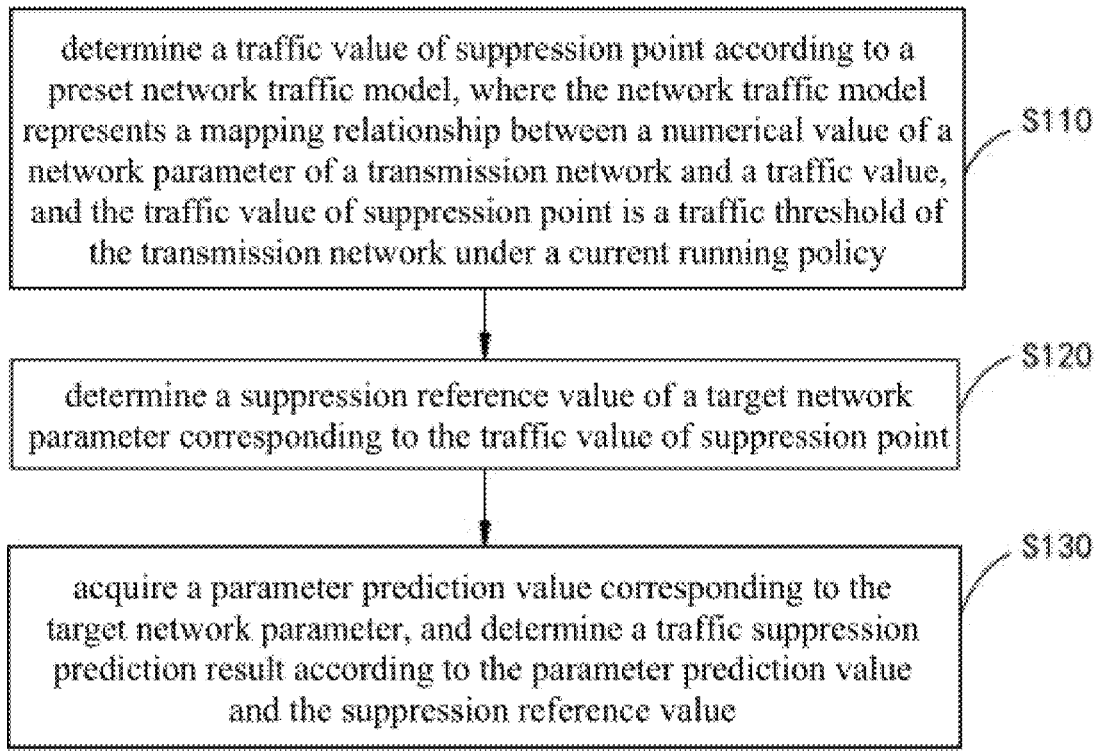
FIG. 1 is a flowchart of a method for predicting traffic suppression according to an embodiment of the present disclosure.

As shown in FIG. 1, FIG. 1 is a flowchart of a method for predicting traffic suppression according to an embodiment of the present disclosure. The method for predicting traffic suppression includes, but not limited to, steps S110, S120, and S130.

At the step S110, a traffic value of suppression point is determined according to a preset network traffic model which represents a mapping relationship between a numerical value of a network parameter of a transmission network and a traffic value. The traffic value of suppression point is a traffic threshold of the transmission network under a current running policy.

It should be noted that the network traffic model may be a pre-trained offline model, or may be obtained through online training after data acquisition. It should be noted that when the network traffic model is obtained through online training, a threshold may be preset for the number of times of training. When a number of times that training of the network traffic model fails reaches the threshold of the number of times of training, execution of subsequent operations is stopped to avoid erroneous traffic suppression prediction due to use of an inaccurate network traffic model. How to adjust the threshold of the number of times of training to ensure the normal use of the network traffic model is well known to those having ordinary skills in the art, so the details will not be described herein.

It can be understood that the network parameter may be any parameter that can affect cell traffic, such as the number of Radio Resource Control (RRC) connection users, the number of activated users, a service channel resource utilization rate, a control channel resource utilization rate, Spectrum Efficiency (SE), a cell traffic volume, an average Modulation and Coding scheme (MCS), an average Channel Quality Indicator (CQI), an average Signal-to-Interference-plus-Noise Ratio (SINR), etc., which is not limited in this embodiment.

It should be noted that the network traffic model may be a law obeyed by network traffic and the network parameter. Because a suppression point represents an inflection point where the traffic volume begins to decline, the traffic threshold may be an average maximum traffic value that the transmission network can reach. Therefore, one or more of the above network parameters may be selected to predict traffic suppression. When one network parameter is selected for traffic prediction, for example, when the user number is selected as the network parameter, a correspondence between the number of activated users and the network traffic can be determined according to the network traffic model, and an average maximum traffic value that can be reached under different values of the number of activated users may be determined as the traffic value of suppression point. For another example, when a plurality of network parameters, e.g., four network parameters including the user number, the service channel resource utilization rate, the control channel resource utilization rate, and channel quality, are selected for traffic prediction, an average maximum traffic value that a cell can reach under different values of the four network parameters may be determined as the traffic value of suppression point. In this case, the traffic value of suppression point is associated with the four network parameters, such that the maximum traffic volume that the cell can reach under the influence of the four network parameters can be determined.

It can be understood that because different policies are used for network optimization according to actual situations during operation of a cell network, the traffic value of suppression point of the cell network varies with different running policies, i.e., the suppression point shifts with different running policies. Therefore, in order to improve the accuracy of traffic suppression prediction, the traffic value of suppression point needs to be acquired according to the current running policy.

At the step S120, a suppression reference value of a target network parameter corresponding to the traffic value of suppression point is determined.

It should be noted that with reference to the above description, the number of target network parameters may be arbitrary. Therefore, in order to realize the prediction of traffic suppression, suppression reference values of all target network parameters corresponding to the traffic value of suppression point need to be determined. For example, when one of the parameters, e.g., the user number, is used as the target network parameter, a suppression reference value corresponding to the user number needs to be determined. When the target network parameters include the four parameters as discussed in the above example, suppression reference values of the user number, the service channel resource utilization rate, the control channel resource utilization rate, and the channel quality when the traffic value of suppression point is reached need to be determined, to provide an accurate data basis for the prediction of traffic suppression.

At the step S130, a parameter prediction value corresponding to the target network parameter is acquired, and a traffic suppression prediction result is determined according to the parameter prediction value and the suppression reference value.

It should be noted that the parameter prediction value may be obtained through model prediction. For example, a parameter prediction model is preset to obtain a parameter prediction value representing a future traffic status of the cell. It can be understood that when the parameter prediction value is obtained through the parameter prediction model, data inputted to the parameter prediction model may be either a time series feature vector with a particular time granularity or a scalar representing a current status. For example, a data sequence with a granularity of 15 minutes in the past week is used as a feature vector and inputted to the prediction model, to predict a parameter value of the cell at a granularity of 15 minutes in a day in future. Those having ordinary skills in the art have the motivation to select a specific time dimension according to an actual requirement, which is not limited in this embodiment.

It can be understood that because the traffic value of suppression point and the suppression reference value have been obtained through the network traffic model, the parameter prediction value may be obtained and then directly compared with the suppression reference value to obtain the traffic suppression prediction result. For example, when there is only one target network parameter, and the parameter prediction value is greater than the suppression reference value, it can be determined that with the increase of the numerical value of the target network parameter, the network traffic is limited and less than the traffic value of suppression point, i.e., traffic suppression occurs. For another example, when the target network parameters include the four parameters as discussed in the above example, the service channel resource utilization rate, the control channel resource utilization rate, and the channel quality are quantified, and a relationship model between the user number and the network traffic is acquired using a cutting plane method. Then, an inflection point model currently used is determined according to current statuses of the service channel resource utilization rate, the control channel resource utilization rate, and the channel quality of the network. Further, it is determined according to a single-parameter method whether suppression occurs, and a corresponding suppression amount, when suppression occurs, is acquired for subsequent prediction.

It should be noted that in order to improve the accuracy of prediction, the parameter prediction model and the network traffic model may be trained using identical sample set, and a corresponding training set and test set may be acquired from the sample set according to the specific model type used respectively, which is not limited in this embodiment.

Figure 2:
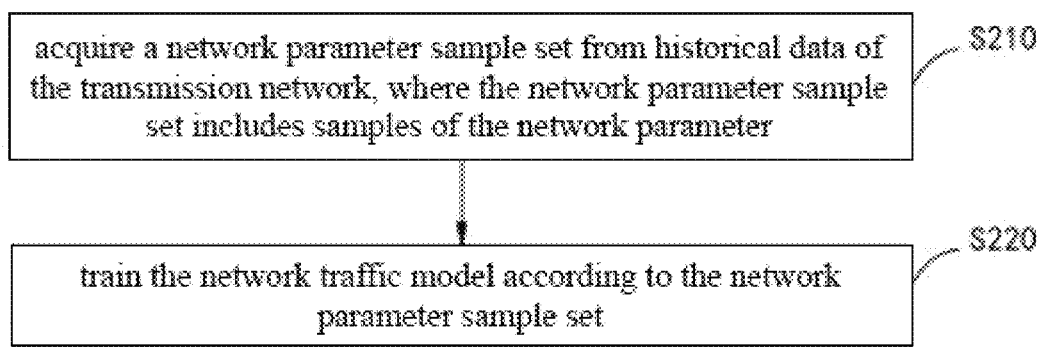
FIG. 2 is a flowchart of training a network traffic model based on historical data according to another embodiment of the present disclosure.

In addition, referring to FIG. 2, in an embodiment, before the step S110 in the embodiment shown in FIG. 1 is executed, the method further includes, but not limited to, following steps S210 to S220.

At the step S210, a network parameter sample set is acquired from historical data of the transmission network. The network parameter sample set includes samples of the network parameter.

At the step S220, the network traffic model is trained according to the network parameter sample set.

It should be noted that because the network traffic model is a law obeyed by the network parameter and the network traffic. Therefore, acquiring the network parameter sample set from the historical data of the transmission network and training the network traffic model enable the network traffic model to reflect a historical operation status of the transmission network. When traffic suppression has previously occurred in the transmission network during the historical operation process, the traffic value of suppression point can be quickly determined by using mathematical characteristics of the network traffic model. For example, an average maximum traffic value during the historical operation process may be acquired as the traffic value of suppression point, thereby improving the prediction efficiency. In addition, provided that the running policy remains unchanged, suppression points of the transmission network are usually close to each other, and a suppression point during the historical operation process may be determined as a current suppression point of the network. Therefore, compared with a method of training a network traffic model to predict the traffic value of suppression point, the method of training the network traffic model based on historical data and then determining the suppression point by using the mathematical characteristics of the model can effectively improve the accuracy of the suppression point, thereby improving the accuracy of traffic prediction.

It should be noted that how to acquire the historical data of the transmission network is well known to those having ordinary skills in the art, so the details will not be described in this embodiment. For example, the historical data may be acquired from a network management system, a management and control network element, a data service module, or other device of the cell network.

Figure 3:
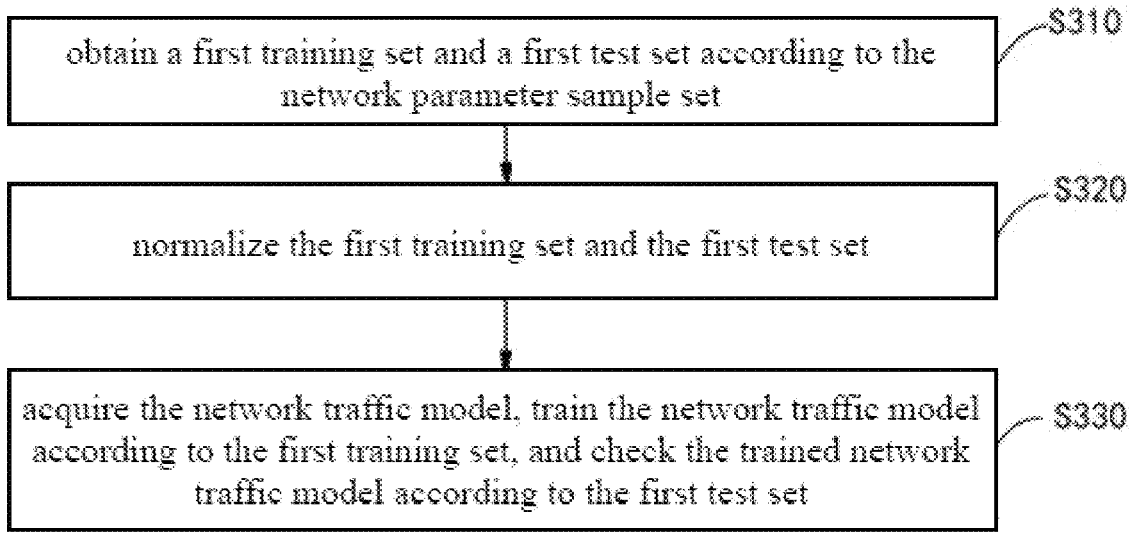
FIG. 3 is a flowchart of training a network traffic model according to another embodiment of the present disclosure.

In addition, referring to FIG. 3, in an embodiment, the step S220 in the embodiment shown in FIG. 2 further includes, but not limited to, following steps S310 to S330.

At the step S310, a first training set and a first test set are obtained according to the network parameter sample set.

At the step S320, the first training set and the first test set are normalized.

At the step S330, the network traffic model is acquired, then the network traffic model is trained according to the first training set, and the trained network traffic model is checked according to the first test set.

It should be noted that before the network parameter sample set is used, preprocessing such as data cleaning may be performed on the network parameter sample set, to improve the integrity and availability of data, which will not be described in detail in this embodiment.

It should be noted that those having ordinary skills in the art have the ability to classify samples in the network parameter sample set into the first training set and the first test set by using different policies according to actual requirements, which will not be described in detail in this embodiment.

It is to be noted that the first training set and the first test set may be normalized using a min-max normalization method or other alternative normalization methods, and how to use the methods to normalize the sample set is well known to those having ordinary skills in the art, so the details will not be described in this embodiment.

It should be noted that the network traffic model may be a commonly used machine learning model, such as a fully-connected neural network model, and may also be a machine learning model decision tree, a regression model, etc. Those having ordinary skills in the art have the motivation to select a specific model type according to an actual situation. Taking the fully-connected neural network model as an example, the network traffic model includes an input layer, an output layer, and multiple hidden layers. The input layer is configured for inputting a network parameter in the network parameter sample set, and the output layer is configured for outputting a prediction result, such as SE or cell traffic volume. How to adjust the number of the hidden layers and the number of neurons according to an actual situation to enable the trained model to meet requirements is well known to those having ordinary skills in the art, so the details will not be described in this embodiment.

It can be understood that because the first training set and the first test set have been normalized, an output of the network traffic model after training and testing needs to be inversely normalized to obtain a final output of the network traffic model. The specific inverse normalization method needs to correspond to the normalization method, which will not be described in detail in this embodiment.

Figure 4:
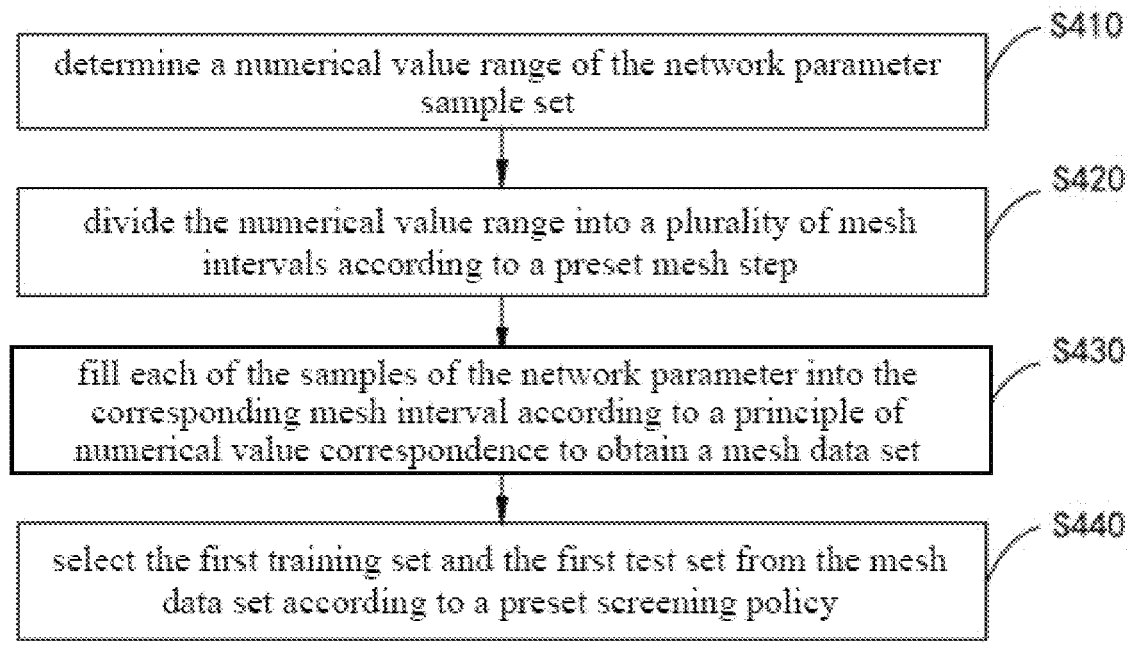
FIG. 4 is a flowchart of performing grid division on a network parameter sample set according to another embodiment of the present disclosure.

In addition, referring to FIG. 4, in an embodiment, S310 in the embodiment shown in FIG. 3 further includes, but not limited to, following steps S410 to S440.

At the step S410, a numerical value range of the network parameter sample set is determined.

At the step S420, the numerical value range is divided into a plurality of mesh intervals according to a preset mesh step.

At the step S430, each of the samples of the network parameter is filled into the corresponding mesh interval according to a principle of numerical value correspondence to obtain a mesh data set.

At the step S440, the first training set and the first test set are selected from the mesh data set according to a preset screening policy.

It should be noted that the numerical value range of the network parameter sample set may be determined by determining a maximum value of the network parameter, and the details will not be described herein. If multiple network parameters are involved, a maximum value of each network parameter may be determined separately.

It is to be noted that the specific value of the mesh step may be determined according to an actual requirement, which is not limited in this embodiment. For example, the network parameter is the user number and has a value range of [0, UserNumMax], where UserNumMax is a maximum value of the user number, and the preset mesh step is defined as UserNumMeshStep. In this case, the numerical value range may be divided into UserNumMeshNum mesh blocks, where UserNumMeshNum=(UserNumMax/UserNumMeshStep). If there are multiple network parameters, the numerical value range of each network parameter may be divided into corresponding mesh intervals based on the above method, which will not be repeated herein.

It should be noted that because the mesh intervals are actually value ranges, each of the samples of each network parameter may be filled into the corresponding mesh interval by using the numerical value of the sample of each network parameter as a key value.

It should be noted that those having ordinary skills in the art have the motivation to select a specific screening policy according to an actual situation. For example, a specific screening policy is as follows. A mesh block threshold MeshSampleMin is set in such way so that for each mesh block containing more than 2×MeshSampleMin pieces of data, an average value of ½ of the number of samples randomly selected from the data in the mesh block is determined as a first training set of the mesh block, and an average value of the other ½ of the number of samples is determined as a first test set of the mesh block; each mesh block containing less than MeshSampleMin pieces of data is discarded; and for each mesh block containing no less than MeshSampleMin and no more than 2*MeshSampleMin pieces of data, an average of the data in the mesh block is determined as a first test set of the mesh block.

Figure 5:
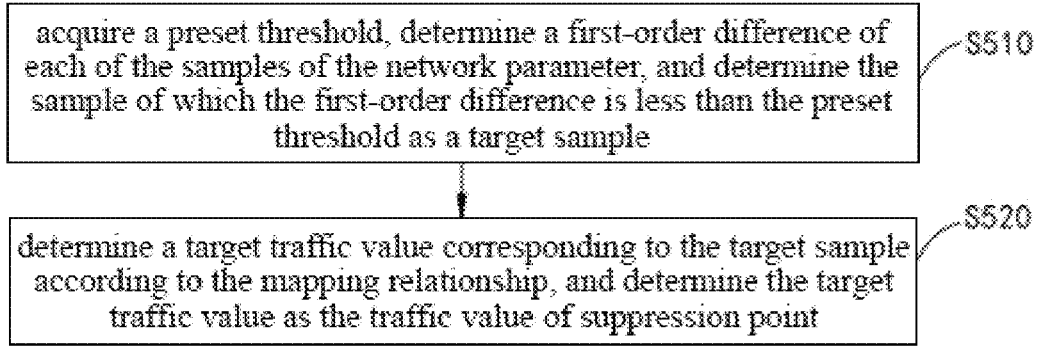
FIG. 5 is a flowchart of determining a traffic value of suppression point according to another embodiment of the present disclosure.

In addition, referring to FIG. 5, in an embodiment, the step S120 in the embodiment shown in FIG. 1 further includes, but not limited to, following steps S510 to S520.

At the step S510, a preset threshold is acquired, a first-order difference of the samples of the network parameter is determined, and the sample of which the first-order difference is less than the preset threshold is determined as a target sample.

At the step S520, a target traffic value corresponding to the target sample is determined according to the mapping relationship, and the target traffic value is determined as the traffic value of suppression point.

It can be understood by those having ordinary skills in the art that the first-order difference is a difference between two successive adjacent terms in a discrete function, and the traffic value of suppression point is the average maximum traffic value that can be achieved by the current transmission network. For the transmission network, at the beginning, the traffic value increases with the increase of the numerical value of the network parameter. The increase gradually slows down as the suppression point is being reached. Finally, when the suppression point is reached, the traffic value stops increasing. Thereafter, the traffic value decreases with the increase of the numerical value of the network parameter. Therefore, theoretically, when a first-order difference between two adjacent samples is zero, it can be determined that traffic suppression occurs, and the corresponding traffic value is the traffic value of suppression point. However, in practice, only a limited number of samples can be acquired, so it is difficult to ensure that at least two samples in a traffic suppression region can be acquired. Therefore, a small threshold may be set, and when a first-order difference between two samples is less than the threshold, it can be determined that the samples are close to the suppression point. The specific value of the threshold may be adjusted according to the actual number of samples, which is not limited in this embodiment.

It should be noted that when multiple network parameters, e.g., the user number, the service channel resource utilization rate, the control channel resource utilization rate, and the channel quality in the above example, are involved, the step S510 may be performed for each network parameter to obtain a target sample of each network parameter, which will not be described in detail herein.

It should be noted that because the network traffic model can represent the mapping relationship between the numerical value of network parameter and the network traffic, the corresponding target traffic value can be determined according to the numerical value of the target sample after the target sample is determined, and can be further determined as the traffic value of suppression point. The details will not be described herein.

Figure 6:
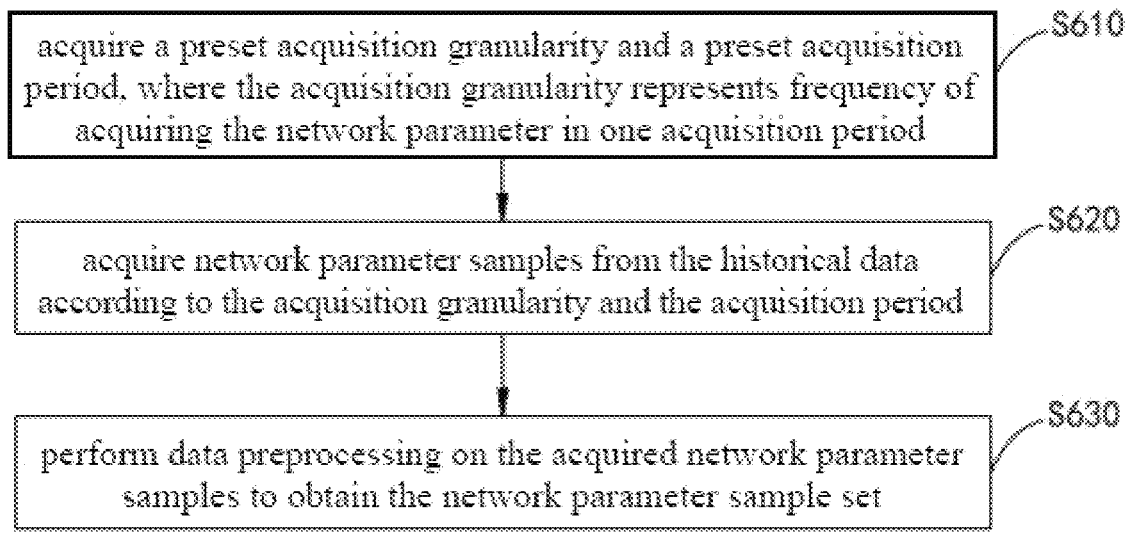
FIG. 6 is a flowchart of data preprocessing according to another embodiment of the present disclosure.

In addition, referring to FIG. 6, in an embodiment, the step S210 in the embodiment shown in FIG. 2 further includes, but not limited to, following steps S610 to S630.

At the step S610, a preset acquisition granularity and a preset acquisition period are acquired. The acquisition granularity represents frequency of acquiring the network parameter in one acquisition period.

At the step S620, network parameter samples are acquired from the historical data according to the acquisition granularity and the acquisition period.

At the step S630, data preprocessing is performed on the acquired network parameter samples to obtain the network parameter sample set.

It should be noted that the specific values of the acquisition granularity and the acquisition period may be determined according to an actual requirement. For example, if the acquisition granularity is one minute and the acquisition period is one day, the network parameter may be collected every minute according to a granularity to obtain a sample. Those having ordinary skills in the art have the motivation to adjust the acquisition granularity and the acquisition period according to an actual requirement, which is not limited herein.

It is to be noted that after the sample acquisition is completed, preprocessing such as data timeline completion, data timeline deduplication, and data completion may be performed on the data set, and those having ordinary skills in the art have the motivation to increase or reduce the preprocessing operations according to an actual situation.

It can be understood that, the data timeline completion can solve the lack of sample data within several granularities in the acquisition process. If some data information on the timeline is missing, the data corresponding to the timeline may be padded with "null", to avoid the failure of acquiring data from the data set, so as not to affect subsequent operations.

It can be understood that the data timeline deduplication can solve the problem of repeated data acquisition within several granularities in the data acquisition process. A deduplication rule may be keeping data that appears for the first time in the data set and deleting duplicate data that appears subsequently. The specific deduplication rule may be selected according to an actual situation.

It can be understood that the data completion can solve the problem of data missing in the acquisition process. When there is missing data in the head of the data set, the empty data in the head may be filled to become the first non-empty data starting from the head. When there is missing data in the tail of the data set, the empty data in the tail may be filled to become the first non-empty data starting from the tail. When there is missing data in the middle of the data set, the first non-empty data may be searched forward and backward respectively, and linear interpolation padding may be performed. Of course, the missing data may also be filled with the mean value. The specific data completion method may be selected according to an actual requirement.

Figure 7:
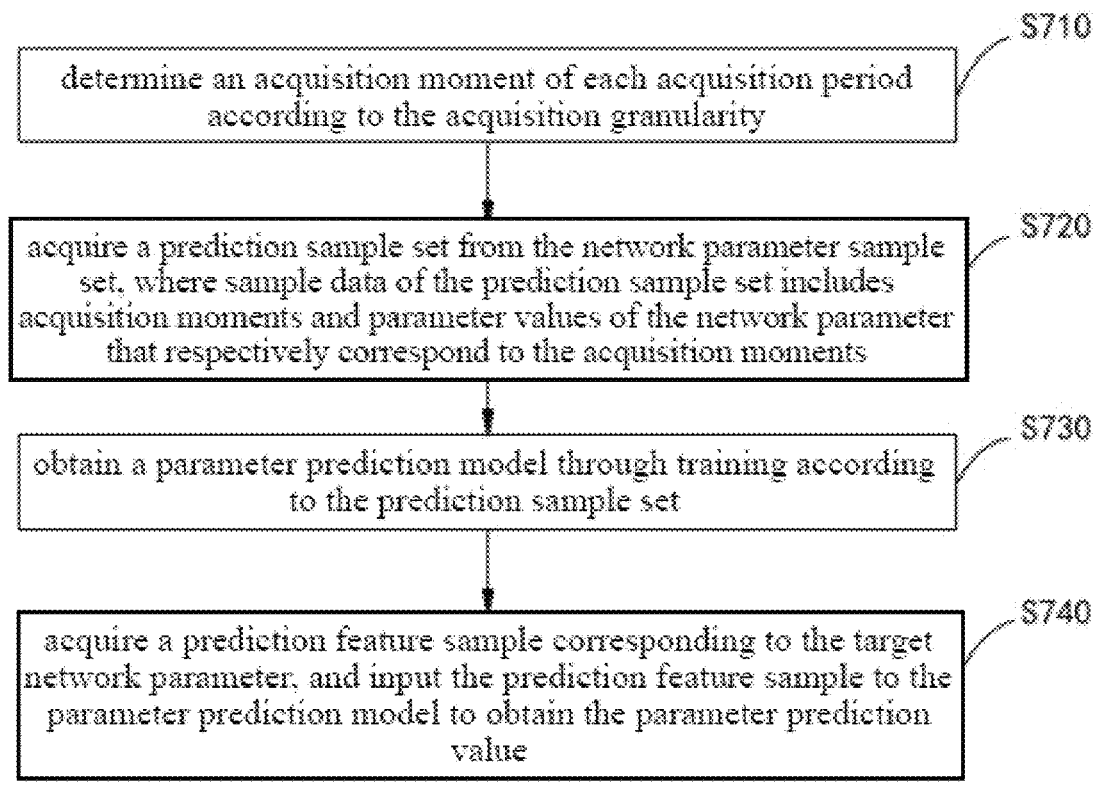
FIG. 7 is a flowchart of acquiring a parameter prediction value according to another embodiment of the present disclosure.

In addition, referring to FIG. 7, in an embodiment, the step S130 in the embodiment shown in FIG. 1 further includes, but not limited to, following steps S710 to S740.

At the step S710, an acquisition moment of each acquisition period is determined according to the acquisition granularity.

At the step S720, a prediction sample set is acquired from the network parameter sample set. Sample data of the prediction sample set includes acquisition moments and parameter values of the network parameter that respectively correspond to the acquisition moments.

At the step S730, a parameter prediction model is obtained through training according to the prediction sample set.

At the step S740, a prediction feature sample corresponding to the target network parameter is acquired, and the prediction feature sample is inputted to the parameter prediction model to obtain the parameter prediction value.

It should be noted that the acquisition granularity generally represents the frequency of acquisition, and acquisition moments in the acquisition period are determined according to the frequency of acquisition. For example, the acquired prediction sample set may be in a form shown in Table 1. Table 1 shows sample data corresponding to one network parameter. If there are multiple network parameters, data corresponding to the network parameters at the acquisition moments is added. The details will not be repeated herein. In Table 1, N represents a data length of the network parameter sample set, each row in the table represents samples of one network parameter, data_i represents a parameter value of an $i^{th}$ sample, and time_i represents an acquisition moment of data_i.

TABLE 1

Example table of data of prediction sample set

| index | 0 | 1 | 2 | ... i | ... N-2 | N-1 |
|---|---|---|---|---|---|---|
| time | time_0 | time_1 | time_2 | time_i | time_N-2 | time_N-1 |
| state_data | data_0 | data_1 | data_2 ... | data_i ... | data_N-2 | data_N-1 |

It can be understood that the sample data of the prediction sample set may be of K+L+M+1 dimensions, where K represents parameter values at a same acquisition moment in previous K periods, L represents parameter values of previous L moments, and M represents time information of current data, such as week, hour, minute, holiday or not, etc. In addition, the first K+L+M dimensions of each sample are features of the sample, and the last dimension of each sample is a state value of the sample at the current moment, and is used to represent a label of the sample, to distinguish different samples. It can be understood that the first K+L dimensions of each sample may include all network parameters, which will not be described in detail herein.

It should be noted that the prediction feature sample may be obtained by selecting the time dimension. For example, if parameter prediction values of K periods and L moments in the future need to be predicted, data of the K+L+M dimensions may be acquired from the prediction sample set as the prediction feature sample. Those having ordinary skills in the art have the motivation to adjust the dimensions of the prediction feature sample according to an actual prediction requirement, which is not limited herein.

Figure 8:
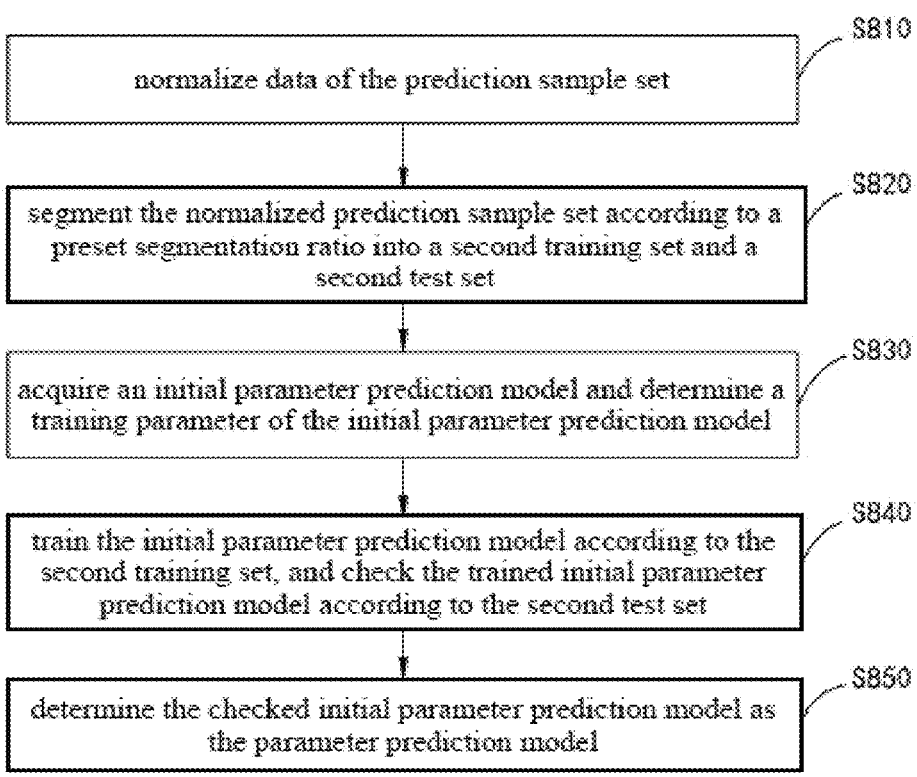
FIG. 8 is a flowchart of training a parameter prediction model according to another embodiment of the present disclosure.

In addition, referring to FIG. 8, in an embodiment, the step S730 in the embodiment shown in FIG. 7 further includes, but not limited to, following steps S810 to S850.

At the step S810, data of the prediction sample set is normalized.

At the step S820, the normalized prediction sample set is segmented according to a preset segmentation ratio into a second training set and a second test set.

At the step S830, an initial parameter prediction model is acquired and a training parameter of the initial parameter prediction model is determined.

At the step S840, the initial parameter prediction model is trained according to the second training set, and the trained initial parameter prediction model is checked according to the second test set.

At the step S850, the checked initial parameter prediction model is determined as the parameter prediction model.

It should be noted that when multiple network parameters are involved, data of samples of each prediction sample set may further be normalized after the prediction sample set is acquired. For example, an acquisition moment of a sample, the user number, the service channel resource utilization rate, the control channel resource utilization rate, and the channel quality are normalized. Then, the normalized prediction sample set may be segmented according to the preset segmentation ratio to obtain a second training set and a second test set.

It should be noted that the initial parameter prediction model may be a Long Short-Term Memory (LSTM) neural network, and may also be other alternative machine learning model decision tree, a regression model, etc. Those having ordinary skills in the art have the motivation to select a specific model according to an actual requirement, which will not be described in detail herein.

It can be understood that during initialization of the model, a neural network weight and bias may be randomly initialized, an activation function may be selected, and a maximum number of times of iterative training and a model error of a state prediction model may be defined. The model error is defined as a mean absolute error. An absolute error between a predicted value state_predict and a true value state_true of a parameter may be obtained by the following formula:

$$\varepsilon_j = \frac{\sum_{i=1}^{N1}(\text{state\_predict\_i} - \text{state\_true\_i})^2}{\sum_{i=1}^{N1}(\text{state\_true\_i})^2},$$

and $$\varepsilon_{relative} = \frac{\sum_{j=1}^{N2} \varepsilon_j}{N2},$$

where N1 represents an output feature dimensionality and N2 is the number of samples.

It should be noted that after the prediction feature sample is acquired, the prediction feature sample may further be normalized, and a normalization parameter and a normalization method used for the prediction feature sample are identical for the prediction sample set, so as to ensure data consistency.

It should be noted that how to train and check the model based on the second training set and the second test set after the specific model and parameter are determined is well known to those having ordinary skills in the art, so the details will not be described herein.

Figure 9:
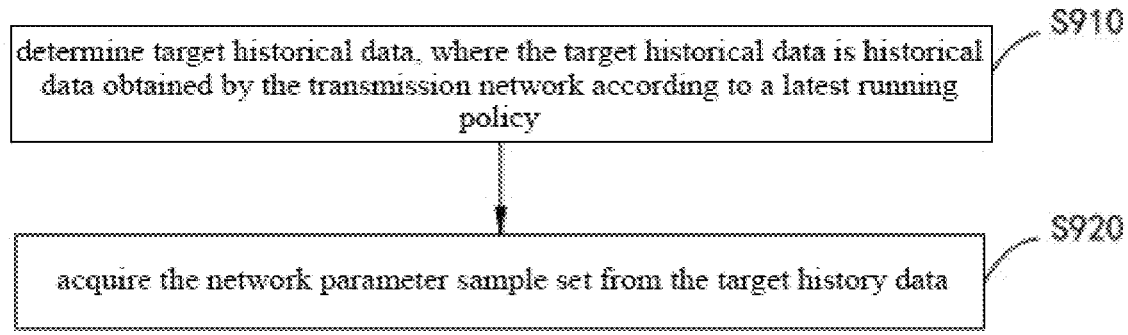
FIG. 9 is a flowchart of acquiring history data according to another embodiment of the present disclosure.

In addition, referring to FIG. 9, in an embodiment, the step S210 in the embodiment shown in FIG. 2 further includes, but not limited to, following steps S910 to S920.

At the step S910, target historical data is determined. The target historical data is historical data obtained by the transmission network according to a latest running policy.

At the step S920, the network parameter sample set is acquired from the target history data.

It should be noted that after traffic suppression occurs, a decision-making module generally determines a root cause of the traffic suppression according to feature data of the suppression point, and then obtain a network optimization policy to increase the cell traffic. Therefore, when the running policy changes, the suppression point changes correspondingly. The suppression point under the current running policy cannot be accurately predicted by the network traffic model and the parameter prediction model that are obtained through training according to historical data of previous running policies. Therefore, when it is detected that the running policy changes, the historical data of the latest running policy may be determined as the target historical data, and the network parameter sample may be re-acquired from the target historical data.

It can be understood that when the network parameter sample set changes, the previously obtained network traffic model and parameter prediction model have to be trained and checked again to ensure the accuracy of prediction. The methods of training and testing the models will not be repeated herein.

It should be noted that the network traffic model and the parameter prediction model may be updated in response to a change in the running policy, or may be regularly updated with the latest data according to a preset timer and update period, thereby effectively improving the accuracy of the network traffic model and the parameter prediction model.

Figure 10:
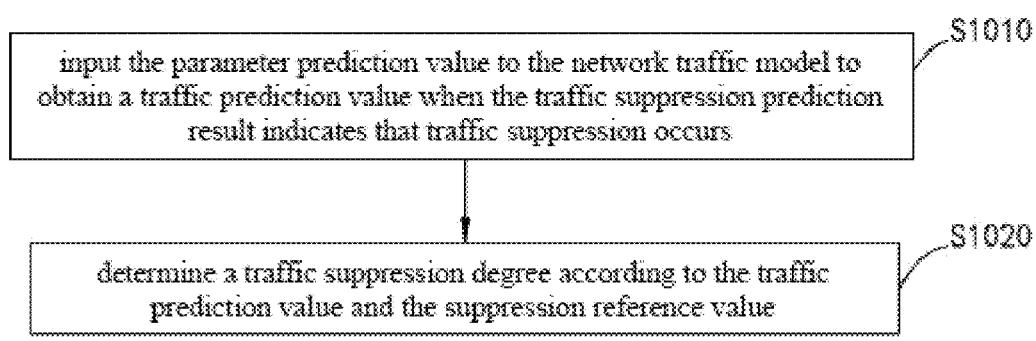
FIG. 10 is a flowchart of determining a root cause network parameter according to another embodiment of the present disclosure.

In addition, referring to FIG. 10, in an embodiment, after the step S130 in the embodiment shown in FIG. 1 is executed, the method further includes, but not limited to, following steps S1010 to S1020.

At the step S1010, the parameter prediction value is inputted to the network traffic model to obtain a traffic prediction value when the traffic suppression prediction result indicates that traffic suppression occurs.

At the step S1020, a traffic suppression degree is determined according to the traffic prediction value and the suppression reference value.

It should be noted that when the running policy remains unchanged, the relationship between the parameter prediction value and the traffic value conforms to the network traffic model, so the traffic prediction value corresponding to the parameter prediction value can be determined according to the mapping relationship reflected by the network traffic model.

It should be noted that when the traffic suppression degree is analyzed, a traffic loss may further be determined according to an actual requirement, for example, an absolute traffic loss amount and a relative traffic loss degree. The absolute traffic loss amount is Max(CellBestThp−CellPredictThp, 0), where CellBestThp represents the traffic value of suppression point and CellPredictThp represents the traffic prediction value. The relative traffic loss degree is Max(CellBestThp−CellPredictThp, 0)/CellBestThp. Those having ordinary skills in the art have the motivation to select other parameters that can represent the traffic loss according to an actual requirement, which will not be limited herein.

It should be noted that when the network parameter sample set involves only one network parameter, an analysis may be made only for the network parameter. If the network parameter sample set involves multiple network parameters, the cutting plane method described in the embodiment shown in the step S130 in FIG. 1 is used to acquire the relationship between the user number and the network traffic.

Figure 11:
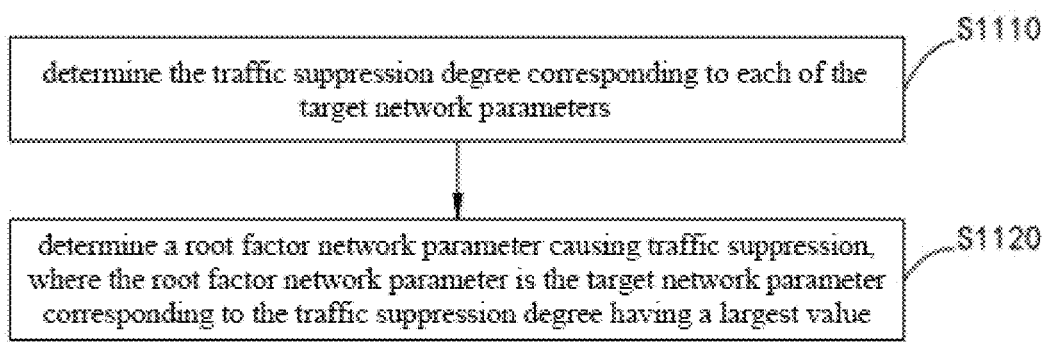
FIG. 11 is a flowchart of determining a traffic suppression degree according to another embodiment of the present disclosure.

In addition, in an embodiment, the network traffic model includes at least two different target network parameters, and referring to FIG. 11, after the step S1020 in the embodiment shown in FIG. 10 is executed, the method further includes, but not limited to, following steps S1111 to S1120.

At the step S1111, the traffic suppression degree corresponding to each of the target network parameters is determined.

At the step S1120, a root cause network parameter causing traffic suppression is determined. The root cause network parameter is the target network parameter corresponding to the traffic suppression degree having a largest value.

It should be noted that if multiple different target network parameters are involved, which have different impact on the traffic, the target network parameter having the greatest impact on traffic suppression needs to be determined, so as to obtain a more accurate network optimization policy. The technical scheme of this embodiment with four target network parameters, for example, will be illustrated below. The four target network parameters are the user number, the service channel resource utilization rate, the control channel resource utilization rate, and the channel quality.

A slicing operation is performed on the network traffic model according to the suppression reference values to obtain a first component slice of the suppression reference value of each target network parameter. Because generally the traffic value first increases to a maximum and then decreases, an average value of first-order differences of a front part of respective first component slices may be acquired and defined as a first average value. For example, the first half of data in each first component slice may be acquired. The specific data range may be determined according to the actual data distribution. Then, a slicing operation is performed on the network traffic model according to the traffic prediction values to obtain a second component slice of the traffic prediction value of each target network parameter. A second average value is obtained in identical manner as that used for the first component slice. The suppression degree is calculated according to the average value of the first-order differences. Taking the user number as an example, the suppression degree of the user number satisfies the following relationship:

$$\text{UserNum\_suppression\_ratio} = (\text{diff\_UserNum\_best} - \text{diff\_UserNum})/\text{diff\_UserNum\_best},$$

where UserNum_suppression_ratio represents the suppression degree, diff_UserNum_best represents the first average value, and diff_UserNum represents the second average value.

It should be noted that after the traffic suppression degree corresponding to each target network parameter is determined, the target network parameter corresponding to a higher traffic suppression degree means that the target network parameter has greater impact on suppression, i.e., is more likely to cause traffic suppression. Therefore, the root cause network parameter can be determined according to the numerical values of the traffic suppression degrees. In this way, a main factor of traffic suppression is determined. Traffic suppression can be alleviated to a greater extent by performing network optimization for the main factor.

In addition, in an embodiment, the traffic value of suppression point is an average maximum traffic value of the transmission network under the current running policy.

It should be noted that according to the description of the suppression point in the above embodiments, the traffic threshold may be the average maximum traffic value of the transmission network under the current running policy. For example, a plurality of maximum traffic values are obtained through training of the network traffic model, and then the average maximum traffic value is calculated according to the plurality of maximum traffic values, thereby improving value of the traffic value of suppression point as a reference in prediction.

Figure 12:
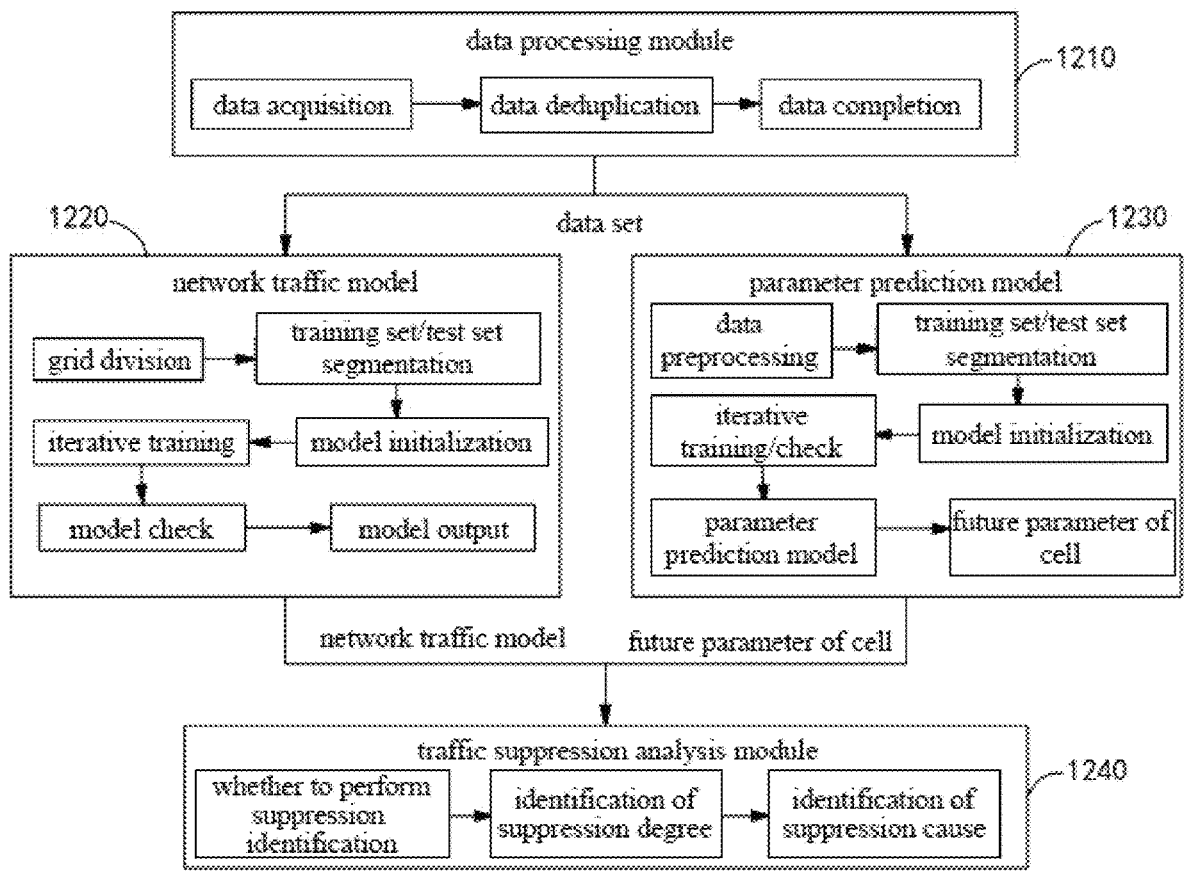
FIG. 12 is a structural diagram of a network traffic management system according to another embodiment of the present disclosure.

In addition, referring to FIG. 12, an embodiment of the present disclosure provides a network traffic management system, including a data processing module 1210, a network traffic model 1220, a parameter prediction model 1230, and a traffic suppression analysis module 1240.

The data processing module 1210 is configured to perform data acquisition to obtain a network parameter sample set, and perform data preprocessing including but not limited to data deduplication and data completion. For the methods of data deduplication and data completion, reference may be made to the description of the embodiment shown in FIG. 6, and the details will not be repeated herein.

The network traffic model 1220 is configured to perform grid division on the network parameter sample set, and obtain a first training set and a first test set according to a screening policy. For the specific principle and method, reference may be made to the description of the embodiment shown in FIG. 4. In addition, after the model is initialized, iterative training and model checking are performed to obtain a trained network traffic model. For the specific principle and method, reference may be made to the description of the embodiment shown in FIG. 3, and the details will not be repeated herein.

The parameter prediction model 1230 is configured to segment the preprocessed data to obtain a second training set and a second test set, and implement initialization, training, and checking of the parameter prediction model according to the second training set and the second test set. For details, reference may be made to the description of the embodiment shown in FIG. 8. In addition, the parameter prediction model 1230 is further configured to output a parameter prediction value representing a future traffic status of the cell in response to inputting of a prediction feature sample. For details, reference may be made to the description of the embodiment shown in FIG. 7.

The traffic suppression analysis module 1240 is configured to determine a traffic suppression result, and when traffic suppression occurs, determine a suppression degree and identify a suppression cause. Reference may be made to the description of the embodiments shown in FIG. 10 and FIG. 11 for details, which will not be repeated herein.

In addition, to better illustrate the technical scheme of the present disclosure, three examples are described below.

Figure 13:
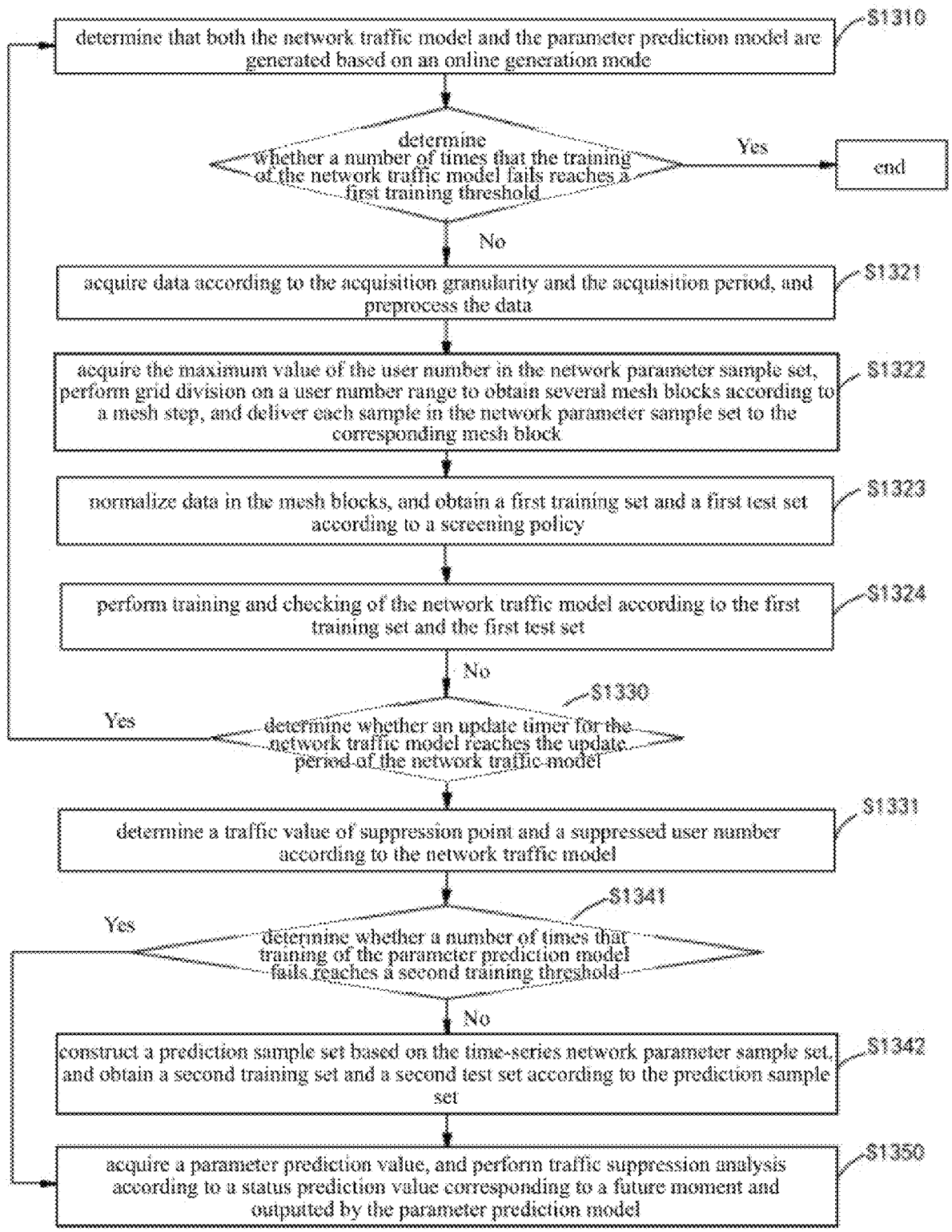
FIG. 13 is a flowchart of Example One according to another embodiment of the present disclosure.

Example One: In this example, a one-dimensional modeling method is adopted, i.e., one network parameter, e.g., the user number, is involved. In addition, the network traffic model and the parameter prediction model are obtained through online training, the parameter prediction value is obtained through model prediction, and the network traffic model and the parameter prediction model are updated regularly. Referring to FIG. 13, this example includes, but not limited to, following steps S1310 to S1350.

At the step S1310, it is determined that both the network traffic model and the parameter prediction model are generated based on an online generation mode, and it is determined whether a number of times that the training of the network traffic model fails reaches a first training threshold. If so, the process ends; otherwise, the step S1320 is executed.

At the step S1321, data is acquired according to the acquisition granularity and the acquisition period, and the data is preprocessed.

It should be noted that the acquired data is historical data from modules such as a network management system, a network element, or a data service, and includes the number of RRC connection users or activated users and cell traffic. The preprocessing includes data timeline completion, data timeline deduplication, and data completion.

The data timeline completion is implemented online. There may be a lack of sample data within several granularities in the data acquisition process. If some data information on the timeline is missing, timeline completion is performed, to pad the corresponding data with "null".

The data timeline deduplication is implemented online. There may be repeated data acquisition within several granularities in the data acquisition process, so the repeatedly acquired data needs to be deduplicated. A deduplication rule is to keep data that appears for the first time in the data set and delete duplicate data that appears subsequently.

The data completion is implemented online. If there is missing data in the head of the data set, the empty data in the head is filled to become first non-empty data starting from the head. If there is missing data in the tail of the data set, the empty data in the tail may be filled to become first non-empty data starting from the tail. When there is missing data in the middle of the data set, the first non-empty data may be searched forward and backward respectively, and linear interpolation padding may be performed. The data set obtained after the padding is used as the network parameter sample set.

At the step S1322, the maximum value of the user number in the network parameter sample set is acquired, grid division is performed on a user number range to obtain several mesh blocks according to a mesh step, and each sample in the network parameter sample set is delivered to the corresponding mesh block.

It should be noted that the maximum value of the user number is denoted by UserNumMax, the user number range is denoted by [0, UserNumMax], the mesh step is denoted by UserNumMeshStep, and the number of mesh blocks is denoted by UserNumMeshNum. UserNumMeshNum-Ceil (UserNumMax/UserNumMeshStep). Then, the data in the network parameter sample set is delivered to the corresponding mesh block according to the user number.

At the step S1323, data in the mesh blocks is normalized, and a first training set and a first test set are obtained according to a screening policy.

It should be noted that a number threshold MeshSampleMin may be preset for valid mesh blocks. When the number of pieces of data in a mesh block is greater than 2×MeshSampleMin, an average value of ½ of the number of samples randomly selected from the data in the mesh block is determined as a candidate training set of the mesh block, and an average value of the other ½ of the number of samples is determined as a candidate test set of the mesh block. When the number of pieces of data in a mesh block is less than MeshSampleMin, the data in the mesh block is discarded. When the number of pieces of data in a mesh block is between MeshSampleMin and 2×MeshSampleMin, an average value of the data in the mesh block is determined as a candidate training set. Then, the candidate training set and the candidate test set are normalized online respectively to obtain the first training set and the first test set.

At the step S1324, training and checking of the network traffic model are performed according to the first training set and the first test set.

It should be noted that the network traffic model is constructed as a neural network model, and the network traffic model is initialized randomly. The network traffic model is trained using the first training set, and the model is evaluated when a maximum number of times of training is reached. If a training error meets a requirement, the model is tested according to the first test set. If a test error meets a requirement, the network traffic model is outputted. Otherwise, the number of times that training of the network traffic model fails is increased by 1, and then the step S1310 is executed.

At the step S1330, when an update timer for the network traffic model reaches the update period of the network traffic model, the step S1310 is executed; otherwise, the step S1331 is executed.

At the step S1331, a traffic value of suppression point and a suppressed user number are determined according to the network traffic model.

Figure 14:
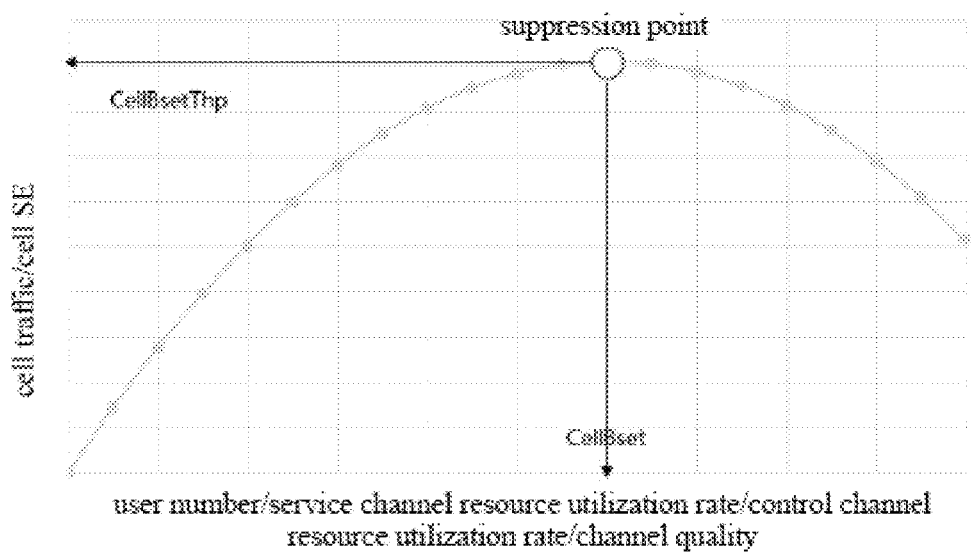
FIG. 14 is a schematic diagram of a one-dimensional mapping relationship of a network traffic model according to another embodiment of the present disclosure.

FIG. 14 is a schematic diagram of a mapping relationship of the network traffic model, where an abscissa represents a network parameter in one dimension, e.g., any one of the user number, the service channel resource utilization rate, the control channel resource utilization rate, and the channel quality, and an ordinate represents a numerical value of cell traffic or cell SE. It can be seen that as the abscissa increases starting from the origin, the cell traffic or cell SE gradually increases, and after the suppression point is reached, the cell traffic or cell SE begins to decrease, indicating that traffic suppression occurs.

At the step S1341, when a number of times that training of the parameter prediction model fails does not reach a second training threshold, the step S1342 is executed; otherwise, a real-time parameter value of the user number is acquired, and the step S1350 is executed by using a filtered value of the real-time parameter value as a predicted parameter value.

At the step S1342, a prediction sample set is constructed based on the time-series network parameter sample set, and a second training set and a second test set are obtained according to the prediction sample set.

It should be noted that each initial data contains an acquisition time and a corresponding user number data, each row in the sample data set represents one prediction sample, and each prediction sample has K+L+M+1 dimensions, where K represents user number values at a same moment in previous K periods, L represents user number values of previous L moments, M represents time information of current data, including week, hour, minute, etc., and the last dimension represents a user number value at the current moment, and is used to represent a label of the prediction sample.

It should be noted that after the prediction sample set is acquired, each column in the prediction sample set may be normalized using a min-max normalization method according to a normalization parameter. The normalized data is segmented into the second training set and the second test set according to a training set/test set segmentation ratio parameter, and the parameter prediction model is trained and checked according to the second training set and the second test set. When training and checking errors meet corresponding preset parameters, the parameter prediction model is outputted; otherwise, the number of times that training of the parameter prediction model fails is increased by 1, and the step S1341 is executed.

At the step S1350, a parameter prediction value is acquired, and traffic suppression analysis is performed according to a status prediction value corresponding to a future moment and outputted by the parameter prediction model.

It should be noted that before the parameter prediction value is acquired, the parameter prediction model needs to be loaded. An update timer for the parameter prediction model is started, and when the update timer for the parameter prediction model reaches an update period, the step S1310 is executed.

It should be noted that to obtain the parameter prediction value, feature data of the prediction feature sample may be normalized using a normalization parameter. Any data greater than 1 after normalization is updated to 1. The prediction feature sample is inputted into the parameter prediction model to obtain an intermediate prediction value in a future time period, and the intermediate prediction value is inversely normalized to obtain a future parameter prediction value.

It should be noted that through the traffic suppression analysis, whether and to which degree traffic will be suppressed can be determined. If the parameter prediction value is less than or equal to a suppression reference value, the traffic will not be suppressed in the future time period; otherwise, the traffic will be suppressed in the future time period. A traffic loss degree may further be determined. For example, the parameter prediction value is inputted into the network traffic model to obtain the traffic prediction value CellPredictThp of the cell traffic. In this case, the absolute traffic loss amount is Max(CellBestThp−CellPredictThp, 0), where CellBestThp represents the traffic value of suppression point; and the relative traffic loss degree is Max (CellBestThp−CellPredictThp, 0)/CellBestThp.

Figure 15:
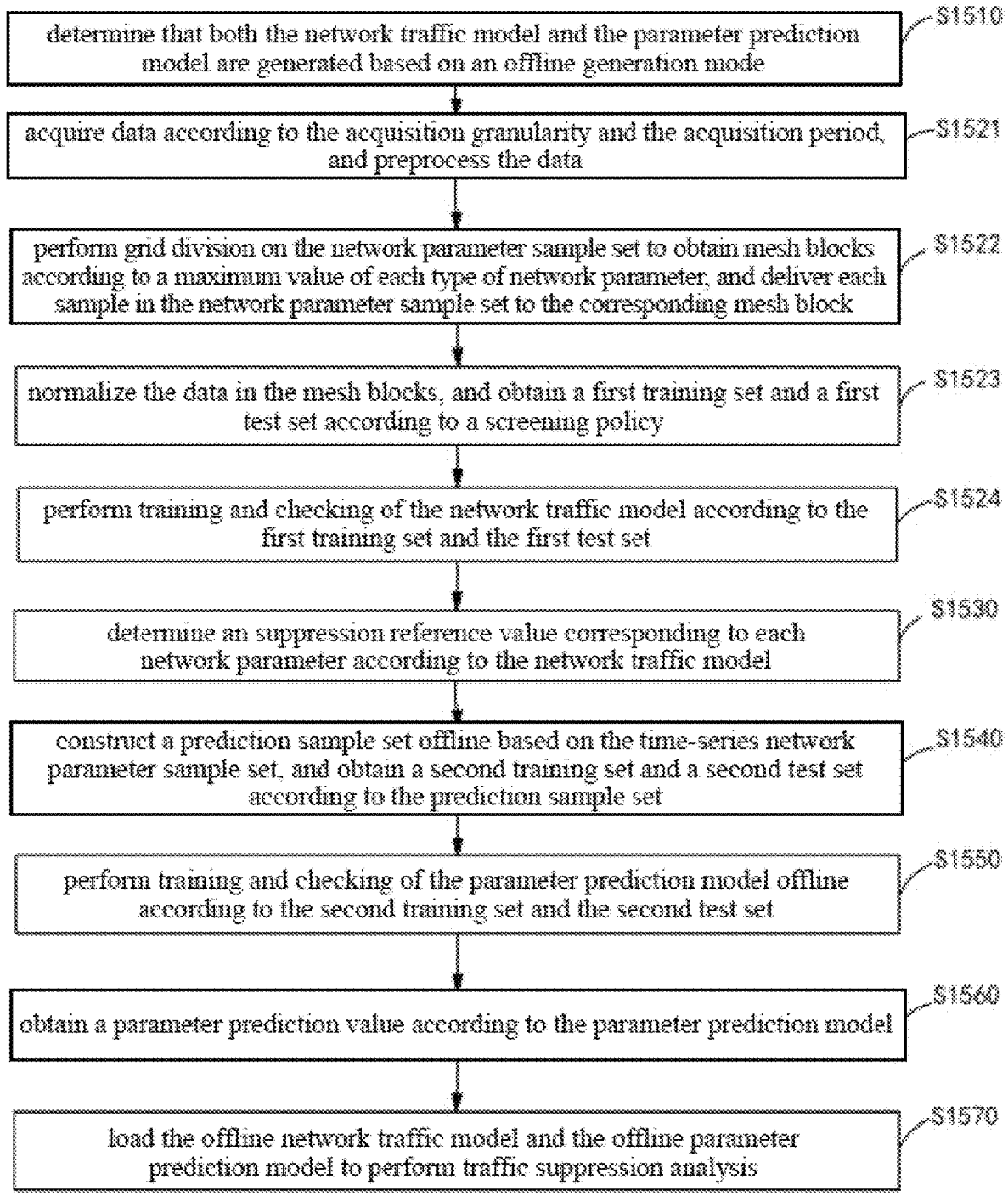
FIG. 15 is a flowchart of Example Two according to another embodiment of the present disclosure.

Example Two: In this example, a multi-dimensional modeling method is adopted, i.e., multiple network parameters, e.g., the user number, the service channel resource utilization rate, the control channel resource utilization rate, and the channel quality, are involved. In addition, the network traffic model and the parameter prediction model are offline models, and the parameter prediction value is obtained through model prediction. Referring to FIG. 15, this example includes, but not limited to, following steps S1510 to S1530.

At the step S1510, it is determined that both the network traffic model and the parameter prediction model are generated based on an offline generation mode.

At the step S1521, data is acquired according to the acquisition granularity and the acquisition period, and the data is preprocessed.

It should be noted that the data preprocessing is implemented offline, and includes data timeline completion. There may be a lack of sample data within several granularities in the data acquisition process. If some data information on the timeline is missing, timeline completion is performed, to pad the corresponding data with "null".

It should be noted that the data preprocessing further includes data completion. If there is missing data in the head of the data set, the empty data in the head is filled to become first non-empty data starting from the head. If there is missing data in the tail of the data set, the empty data in the tail may be filled to become first non-empty data starting from the tail. When there is missing data in the middle of the data set, the first non-empty data may be searched forward and backward respectively, and linear interpolation padding may be performed. The data set obtained after the padding is used as the network parameter sample set.

At the step S1522, grid division is performed on the network parameter sample set according to a maximum value of each type of network parameters, and each sample in the network parameter sample set is delivered to a corresponding mesh block.

It should be noted that the grid division includes the following operations. Maximum values of the user number, the service channel resource utilization rate, the control channel resource utilization rate, and the channel quality are respectively acquired, and are defined as UserNumMax, ShareChannelMax, ControlChannelMax, and ChannelQualityMax according to the above order. A user number range [0, UserNumMax] is divided into UserNumMeshNum=Ceil (UserNumMax/UserNumMeshStep) mesh blocks according to a mesh step UserNumMeshStep. A service channel resource utilization rate range [0, ShareChannelMax] is divided into ShareChannelMeshNum=Ceil(ShareChannelMax/ShareChannelMeshStep) mesh blocks according to a mesh step ShareChannelMeshStep. A control channel resource utilization rate range [0, ControlChannelMax] is divided into ControlChannelMeshNum=Ceil(ControlChannelMax/ControlChannelMeshStep) mesh blocks according to a mesh step ControlChannelMeshStep. A channel quality range [0, ChannelQualityMax] is divided into ChannelQualityMeshNum=Ceil(ChannelQualityMax/ChannelQualityMeshStep) mesh blocks according to a mesh step ChannelQuality MeshStep. A total of UserNumMeshNumxShareChannelMeshNumxControlChannelMeshNumxChannelQuality MeshNum mesh blocks obtained. The data in the data set is delivered to the corresponding mesh blocks by using the user number, the service channel resource utilization rate, the control channel resource utilization rate, and the channel quality as key values.

At the step S1523, the data in the mesh blocks is normalized, and a first training set and a first test set are obtained according to a screening policy.

It should be noted that a number threshold MeshSampleMin may be preset for valid mesh blocks. When the number of pieces of data in a mesh block is greater than 2×MeshSampleMin, an average value of ½ of the number of samples randomly selected from the data in the mesh block is determined as a candidate training set of the mesh block, and an average value of the other ½ of the number of samples is determined as a candidate test set of the mesh block. When the number of pieces of data in a mesh block is less than MeshSampleMin, the data in the mesh block is discarded. When the number of pieces of data in a mesh block is between MeshSampleMin and 2×MeshSampleMin, an average value of the data in the mesh block is determined as a candidate training set. The candidate training set and the candidate test set are normalized offline, to construct the first training set and the first test set of the network traffic model offline.

At the step S1524, training and checking of the network traffic model are performed according to the first training set and the first test set.

It should be noted that the training and testing of network traffic model are both implemented offline.

At the step S1530, a suppression reference value corresponding to each network parameter is determined according to the network traffic model.

It should be noted that the suppression point of the traffic suppression model is obtained and defined as CellBestThp, and the suppression reference value corresponding to each network parameter is determined, which is expressed by the following formula: CellBest=[CellBestUserNum, CellBestShareChannel, CellBestControlChannel, CellBestChannelQuality], where CellBestUserNum represents the suppression reference value of the user number, CellBestShareChannel represents the suppression reference value of the service channel resource utilization rate, CellBestControlChannel represents the suppression reference value of the control channel resource utilization rate, and CellBestChannelQuality represents the suppression reference value of the channel quality.

Figure 16:
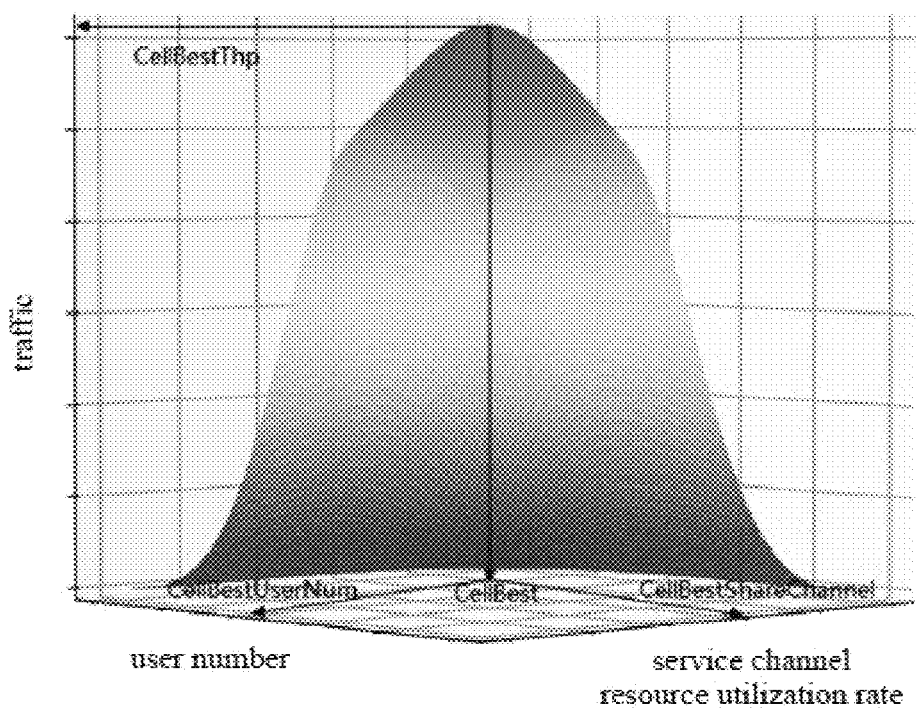
FIG. 16 is a schematic diagram of a two-dimensional mapping relationship of a network traffic model according to another embodiment of the present disclosure.

FIG. 16 is a schematic diagram of a two-dimensional mapping relationship of two network parameters of the network traffic model, where the network parameters include the user number and the service channel resource utilization rate, and an ordinate represents a numerical value of cell traffic or cell SE. It can be seen that as the user number and the service channel resource utilization rate increase starting from the origin, the cell traffic or cell SE gradually increases; an average maximum traffic value is reached at the suppression point; and after the suppression point, an increase in either of the network parameters leads to a decrease in traffic, i.e., traffic suppression occurs.

At the step S1540, a prediction sample set is constructed offline based on the time-series network parameter sample set, and a second training set and a second test set are obtained according to the prediction sample set.

It should be noted that the prediction sample set has a sample size N_Sample. In other words, the prediction sample set may be expressed as D=[data_0, . . . , data_i, . . . , data_N_Sample−1], where an $i^{th}$ prediction sample is denoted by data_i. Each prediction sample has K+L+M+1 dimensions (where K represents parameter values at a same moment in previous K periods, L represents parameter values of previous L moments, and M represents time information of current data, including week, hour, minute, etc.). The first K+L+M dimensions of each sample are features of the sample, and the last dimension of each sample is a parameter value of the sample at the current moment, and is used to represent a label of the sample. Each column in the sample data set D is normalized using a min-max normalization method, where a normalization parameter is defined as NormParameter, and the normalized data set is defined as D_norm. The normalized data D_norm is segmented into a second training set and a second test set according to a training set/test set segmentation ratio parameter alpha.

At the step S1550, training and checking of the parameter prediction model are performed offline according to the second training set and the second test set.

At the step S1560, a parameter prediction value is obtained according to the parameter prediction model.

It should be noted that the obtaining of the parameter prediction value includes the following operations. Data is prepared according to a data processing method. Feature data, denoted by data, of the prediction sample is constructed. The feature data has K+L+M dimensions, where K represents parameter values at a same moment in previous K periods, L represents parameter values of previous L moments, and M represents time information of current data, including week, hour, minute, etc. The feature data of the prediction sample is normalized using a normalization parameter NormParameter to obtain a normalized feature data data_norm. The normalized feature data data_norm is inputted into the parameter prediction model to obtain an intermediate prediction value of a future time period. The intermediate prediction value is inversely normalized to obtain the parameter prediction value, which is defined as CellStatePredict.

At the step S1570, the offline network traffic model and the offline parameter prediction model are loaded to perform traffic suppression analysis.

It should be noted that when the parameter prediction value corresponding each network parameter, i.e., CellStatePredict=[UserNum, ShareChannel, to ControlChannel, ChannelQuality], is respectively less than or equal to CellBest=[CellBestUserNum, CellBestShareChannel, CellBestControlChannel, CellBestChannelQuality], the traffic will not be suppressed in the future time period; otherwise, the traffic will be suppressed in the future time period.

It should be noted that to determine a specific traffic loss, the state prediction value CellStatePredict may be inputted into the network traffic model, to obtain cell traffic CellPredictThp in this state. In this case, the absolute traffic loss amount is Max(CellBestThp−CellPredictThp, 0), and the relative traffic loss degree is Max(CellBestThp−CellPredictThp, 0)/CellBestThp.

It should be noted that a cause of traffic suppression may be analyzed by performing the following operations. Slices of the network traffic model corresponding to components CellBestUserNum, CellBestShareChannel, CellBestControlChannel, and CellBestChannelQuality in CellBest are acquired. For each of the slices, an average value of first-order differences in a preset region of the curve is calculated. The average values are respectively defined as diff_UserNum_best, diff_ShareChannel_best, diff_ControlChannel_best, and diff_ChannelQuality_best. The preset region of the curve may be the first half near the origin. Slices of the network traffic model corresponding to components UserNum, ShareChannel, ControlChannel, and ChannelQuality in CellStatePredict are acquired. For each of the slices, an average value of first-order differences of a point in the first half and a point in the second half of the slice is calculated. The average values are respectively defined as diff_UserNum, diff_ShareChannel, diff_ControlChannel, and diff_ChannelQuality.

After the data is acquired, suppression degrees are calculated. A suppression degree of the user is: number UserNum_suppression_ratio=(diff_UserNum_best−diff_UserNum)/diff_UserNum_best. A suppression degree of service channel resources is: ShareChannel_suppression_ratio=(diff_ShareChannel_best−diff_ShareChannel)/diff_ShareChannel_best. A suppression degree of control channel resources is: ControlChannel_suppression_ratio=(diff_ControlChannel_best−diff_ControlChannel)/diff_ControlChannel_best. A suppression degree of the channel quality is: ChannelQuality_suppression_ratio−(diff_ChannelQuality_best−diff_ChannelQuality)/diff_ChannelQuality_best.

It should be noted that in order to analyze the main factor causing traffic suppression, the largest value among UserNum_suppression_ratio, ShareChannel_suppression_ratio, ControlChannel_suppression_ratio, and ChannelQuality_suppression_ratio may be acquired, according to which the main cause of traffic suppression is determined. If UserNum_suppression_ratio has the largest value, the main factor is a limitation on the user number. If ShareChannel_suppression_ratio has the largest value, the main factor is a limitation on service channel resources. If ControlChannel_suppression_ratio has the largest value, the main factor is a limitation on control channel resources. If ChannelQuality_suppression_ratio has the largest value, the main factor is a limitation on the channel quality.

Figure 17:
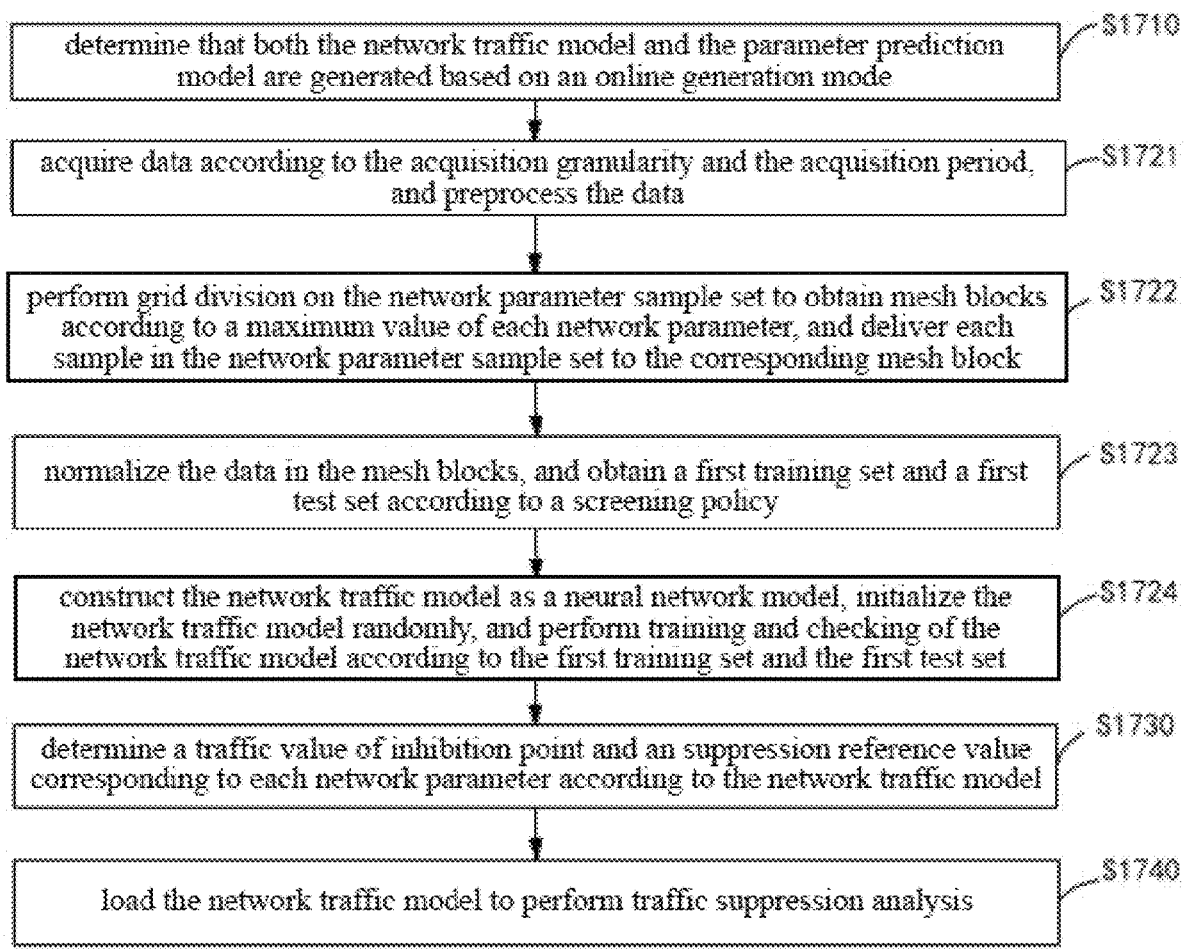
FIG. 17 is a flowchart of Example Three according to another embodiment of the present disclosure.

Example Three: In this example, a two-dimensional modeling method is adopted, i.e., two network parameters, e.g., the service channel resource utilization rate and the control channel resource utilization rate, are involved. In addition, the network traffic model is an online model, and the parameter prediction value is a real-time parameter. Referring to FIG. 17, this example includes, but not limited to, following steps S1710 to S1740.

At the step S1710, it is determined that both the network traffic model and the parameter prediction model are generated based on an online generation mode.

At the step S1721, data is acquired according to the acquisition granularity and the acquisition period, and the data is preprocessed.

It should be noted that the data is acquired from historical data of a network management system based on an acquisition granularity of 15 minutes and an acquisition period of 28 days, including the service channel resource utilization rate, the control channel resource utilization rate, cell traffic, etc. The preprocessing includes data timeline completion, data timeline deduplication, and data completion.

The data timeline completion is implemented online. There may be a lack of sample data within several granularities in the data acquisition process. If some data information on the timeline is missing, timeline completion is performed, to pad the corresponding data with "null".

The data timeline deduplication is implemented online. There may be repeated data acquisition within several granularities in the data acquisition process, so the repeatedly acquired data needs to be deduplicated. A deduplication rule is to keep data that appears for the first time in the data set and delete duplicate data that appears subsequently.

The data completion is implemented online. If there is missing data in the head of the data set, the empty data in the head is filled to become first non-empty data starting from the head. If there is missing data in the tail of the data set, the empty data in the tail may be filled to become first non-empty data starting from the tail. When there is missing data in the middle of the data set, the first non-empty data may be searched forward and backward respectively, and linear interpolation padding may be performed. The data set obtained after the padding is used as the network parameter sample set.

At the step S1722, grid division is performed on the network parameter sample set to obtain mesh blocks according to a maximum value of each network parameter, and each sample in the network parameter sample set is delivered to the corresponding mesh block.

It should be noted that the grid division includes the following operations. Maximum values of the service channel resource utilization rate and the control channel resource utilization rate are respectively acquired, and are respectively defined as ShareChannelMax and ControlChannelMax. A service channel resource utilization rate range [0, ShareChannelMax] is divided into ShareChannelMeshNum=Ceil(ShareChannelMax/ShareChannelMeshStep) mesh blocks according to a mesh step ShareChannelMeshStep. A control channel resource utilization rate range [0, ControlChannelMax] is divided into ControlChannelMeshNum-Ceil(ControlChannelMax/ControlChannelMeshStep) mesh blocks according to a mesh step ControlChannelMeshStep. A total of ShareChannelMeshNum×ControlChannelMeshNum mesh blocks are obtained. The data in the data set is delivered to the corresponding mesh blocks by using the service channel resource utilization rate and the control channel resource utilization rate as key values.

At the step S1723, the data in the mesh blocks is normalized, and a first training set and a first test set are obtained according to a screening policy.

It should be noted that a number threshold MeshSampleMin may be preset for valid mesh blocks. When the number of pieces of data in a mesh block is greater than 2×MeshSampleMin, an average value of ½ of the number of samples randomly selected from the data in the mesh block is determined as a candidate training set of the mesh block, and an average value of the other ½ of the number of samples is determined as a candidate test set of the mesh block. When the number of pieces of data in a mesh block is less than MeshSampleMin, the data in the mesh block is discarded. When the number of pieces of data in a mesh block is between MeshSampleMin and 2×MeshSampleMin, an average value of the data in the mesh block is determined as a candidate training set. The candidate training set and the candidate test set are normalized, to construct the first training set and the first test set of the network traffic model.

At the step S1724, the network traffic model is constructed as a neural network model, the network traffic model is initialized randomly, and training and checking of the network traffic model are performed according to the first training set and the first test set.

At the step S1730, a traffic value of suppression point and a suppression reference value corresponding to each network parameter are determined according to the network traffic model.

It should be noted that the suppression point of the traffic suppression model is obtained and defined as CellBestThp, and the suppression reference value corresponding to each network parameter is determined, which is expressed by the following formula: CellBest=[CellBestShareChannel, CellBestControlChannel], where CellBestShareChannel represents the suppression reference value of the service channel resource utilization rate, and CellBestControlChannel represents the suppression reference value of the control channel resource utilization rate. In addition, the suppression point of the network traffic model is obtained and defined as CellBestThp, and a corresponding feature is defined as CellBest-[CellBestShareChannel, CellBestControlChannel].

At the step S1740, the network traffic model is loaded to perform traffic suppression analysis.

It should be noted that a real-time filtered value of the network parameter is used as the parameter prediction value, which is defined as CellStatePredict. When the state CellStatePredict at a future moment is less than or equal to CellBest, the traffic will not be suppressed in the future; otherwise, the traffic will be suppressed in the future time period.

It should be noted that to determine a specific traffic loss, the state prediction value CellStatePredict may be inputted into the network traffic model, to obtain cell traffic CellPredictThp in this state. In this case, the absolute traffic loss amount is Max(CellBestThp−CellPredictThp, 0), and the relative traffic loss degree is Max(CellBestThp−CellPredictThp, 0)/CellBestThp.

It should be noted that a cause of traffic suppression may be analyzed by performing the following operations. Slices of the network traffic model corresponding to components CellBestShareChannel and CellBestControlChannel in CellBest are acquired. For each of the slices, an average value of first-order differences in a preset region of the curve is calculated. The average values are respectively defined as diff_ShareChannel_best and diff_ControlChannel_best. The preset region of the curve may be the first half near the origin. Slices of the network traffic model corresponding to components ShareChannel and ControlChannel in CellStatePredict are acquired. For each of the slices, an average value of first-order differences of a point in the first half and a point in the second half of the slice is calculated. The average values are respectively defined as diff_ShareChannel and diff_ControlChannel.

After the data is acquired, suppression degrees are calculated. A suppression degree of service channel resources is: ShareChannel_suppression_ratio=(diff_ShareChannel_best−diff_ShareChannel)/diff_ShareChannel_best. A suppression degree of control channel resources is: ControlChannel_suppression_ratio−(diff_ControlChannel_best−diff_ControlChannel)/diff_ControlChannel_best.

It should be noted that to analyze the main factor causing traffic suppression, a larger value of UShareChannel_suppression_ratio and ControlChannel_suppression_ratio may be acquired, according to which the main cause of traffic suppression is determined. If ShareChannel_suppression_ratio has a larger value, the main factor is a limitation on service channel resources. If ControlChannel_suppression_ratio has a larger value, the main factor is a limitation on control channel resources.

Figure 18:
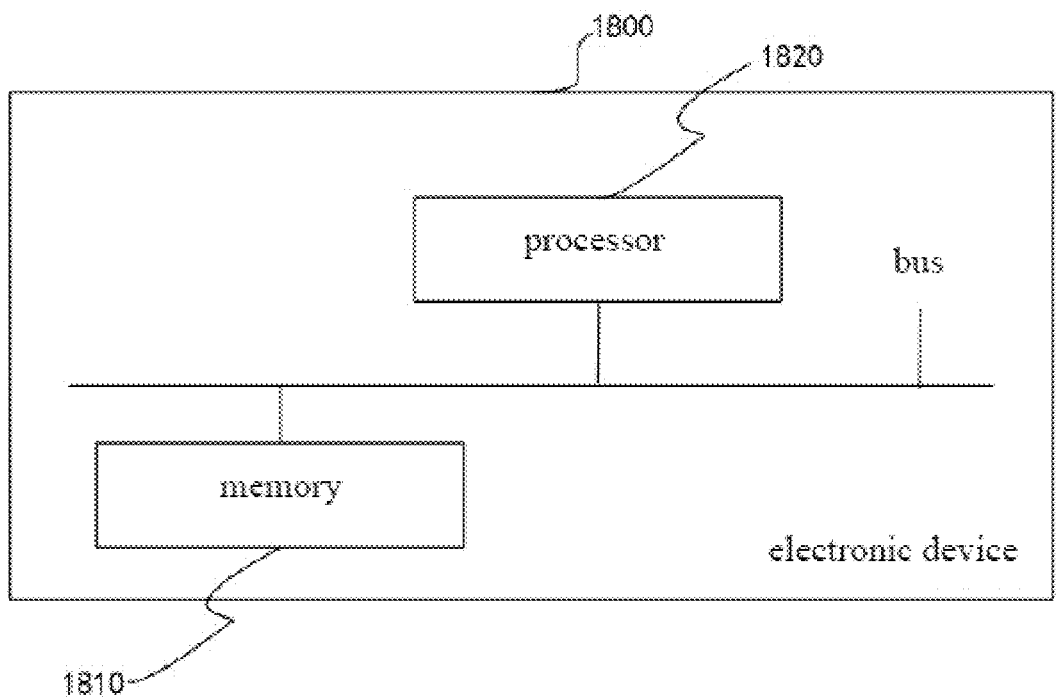
FIG. 18 is a structural diagram of an electronic device according to another embodiment of the present disclosure.

In addition, referring to FIG. 18, an embodiment of the present disclosure further provides an electronic device 1800, including a memory 1810, a processor 1820, and a computer program stored in the memory 1810 and executable by the processor 1820.

The processor 1820 and the memory 1810 may be connected by a bus or in other ways.

The non-transitory software program and instructions required to implement the method for predicting traffic suppression of the foregoing embodiments are stored in the memory 1810 which, when executed by the processor 1820, cause the processor 1820 to perform the method for predicting traffic suppression of the foregoing embodiments, for example, execute the method steps S110 to S130 in FIG. 1, the method steps S210 to S220 in FIG. 2, the method steps S310 to S330 in FIG. 3, the method steps S410 to S440 in FIG. 4, the method steps S510 to S520 in FIG. 5, the method steps S610 to S630 in FIG. 6, the method steps S710 to S740 in FIG. 7, the method steps S810 to S850 in FIG. 8, the method steps S910 to S920 in FIG. 9, the method steps S1010 to S1020 in FIG. 10, the method steps S1110 to S1120 in FIG. 11, the method steps S1310 to S1350 in FIG. 13, the method steps S1510 to S1570 in FIG. 15, and the method steps S1710 to S1740 in FIG. 17.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

In addition, an embodiment of the present disclosure provides a computer-readable storage medium, storing a computer-executable instruction which, when executed by a processor or controller, for example, by a processor in the electronic device embodiment described above, may cause the processor to execute the method for predicting traffic suppression of the foregoing embodiments, for example, execute the method steps S110 to S130 in FIG. 1, the method steps S210 to S220 in FIG. 2, the method steps S310 to S330 in FIG. 3, the method steps S410 to S440 in FIG. 4, the method steps S510 to S520 in FIG. 5, the method steps S610 to S630 in FIG. 6, the method steps S710 to S740 in FIG. 7, the method steps S810 to S850 in FIG. 8, the method steps S910 to S920 in FIG. 9, the method steps S1010 to S1020 in FIG. 10, the method steps S1110 to S1120 in FIG. 11, the method steps S1310 to S1350 in FIG. 13, the method steps S1510 to S1570 in FIG. 15, and the method steps S1710 to S1740 in FIG. 17.

An embodiment of the present disclosure includes: determining a traffic value of suppression point according to a preset network traffic model, where the network traffic model represents a mapping relationship between a numerical value of a network parameter of a transmission network and a traffic value, and the traffic value of suppression point is a traffic threshold of the transmission network under a current running policy; determining a suppression reference value of a target network parameter corresponding to the traffic value of suppression point; and acquiring a parameter prediction value corresponding to the target network parameter, and determining a traffic suppression prediction result according to the parameter prediction value and the suppression reference value. According to the scheme provided in the embodiments of the present disclosure, the traffic value of suppression point can be determined according to the trained network traffic model, to provide a data basis for traffic suppression prediction. In this way, the traffic suppression prediction result corresponding to the target network parameter can be provided before traffic suppression occurs, to provide a data basis for network optimization in advance and effectively improve user experience.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A method for predicting traffic suppression, comprising:
   determining a traffic value of suppression point according to a preset network traffic model which represents a mapping relationship between a numerical value of a network parameter of a transmission network and a traffic value, wherein the traffic value of suppression point is a traffic threshold of the transmission network under a current running policy;
   determining a suppression reference value of a target network parameter corresponding to the traffic value of suppression point;
   acquiring a parameter prediction value corresponding to the target network parameter, and determining a traffic suppression prediction result according to the parameter prediction value and the suppression reference value;
   acquiring a network parameter sample set from historical data of the transmission network, wherein the network parameter sample set comprises samples of the network parameter;
   acquiring a preset acquisition granularity and a preset acquisition period, wherein the acquisition granularity represents frequency of acquiring the network parameter in one acquisition period;
   acquiring network parameter samples from the historical data according to the acquisition granularity and the acquisition period;
   performing data preprocessing on the acquired network parameter samples to obtain the network parameter sample set; and
   determining a root cause network parameter causing traffic suppression based on the traffic suppression prediction result.

2. The method of claim 1, wherein before determining a traffic value of suppression point according to a preset network traffic model, the method further comprises:
   training the preset network traffic model according to the network parameter sample set.

3. The method of claim 2, wherein training the preset network traffic model according to the network parameter sample set comprises:
   obtaining a first training set and a first test set according to the network parameter sample set;
   normalizing the first training set and the first test set; and
   acquiring the preset network traffic model, training the preset network traffic model according to the first training set, and checking the trained network traffic model according to the first test set.

4. The method of claim 3, wherein obtaining a first training set and a first test set according to the network parameter sample set comprises:
   determining a numerical value range of the network parameter sample set;
   dividing the numerical value range into a plurality of mesh intervals according to a preset mesh step;
   filling each of the samples of the network parameter into the corresponding mesh interval according to a principle of numerical value correspondence to obtain a mesh data set; and
   selecting the first training set and the first test set from the mesh data set according to a preset screening policy.

5. The method of claim 2, wherein determining a traffic value of suppression point according to a preset network traffic model comprises:
   acquiring a preset threshold, determining a first-order difference of the samples of the network parameter, and determining the sample of which the first-order difference is less than the preset threshold as a target sample; and
   determining a target traffic value corresponding to the target sample according to the mapping relationship, and determining the target traffic value as the traffic value of suppression point.

6. The method of claim 2, wherein acquiring a parameter prediction value corresponding to the target network parameter comprises:
   determining an acquisition moment of each acquisition period according to the preset acquisition granularity;
   acquiring a prediction sample set from the network parameter sample set, wherein sample data of the prediction sample set comprises acquisition moments and parameter values of the network parameter that respectively correspond to the acquisition moments;
   obtaining a parameter prediction model through training according to the prediction sample set; and
   acquiring a prediction feature sample corresponding to the target network parameter, and inputting the prediction feature sample to the parameter prediction model to obtain the parameter prediction value.

7. The method of claim 6, wherein obtaining a parameter prediction model through training according to the prediction sample set comprises:
   normalizing data of the prediction sample set;
   segmenting the normalized prediction sample set according to a preset segmentation ratio into a second training set and a second test set;
   acquiring an initial parameter prediction model and determining a training parameter of the initial parameter prediction model;
   training the initial parameter prediction model according to the second training set, and checking the trained initial parameter prediction model according to the second test set; and
   determining the checked initial parameter prediction model as the parameter prediction model.

8. The method of claim 1, wherein acquiring a network parameter sample set from historical data of the transmission network comprises:
   determining target historical data, wherein the target historical data is historical data obtained by the transmission network according to a latest running policy; and
   acquiring the network parameter sample set from the target history data.

9. The method of claim 1, wherein after determining a traffic suppression prediction result according to the parameter prediction value and the suppression reference value, the method further comprises:
   inputting the parameter prediction value to the preset network traffic model to obtain a traffic prediction value, in response to the traffic suppression prediction result indicating that traffic suppression occurs; and
   determining a traffic suppression degree according to the traffic prediction value and the suppression reference value.

10. The method of claim 9, wherein the network traffic model comprises at least two different target network parameters, and after determining a traffic suppression degree according to the traffic prediction value and the suppression reference value, the method further comprises:

determining the traffic suppression degree corresponding to each of the target network parameters; and wherein the root cause network parameter is the target network parameter corresponding to the traffic suppression degree having a largest value.

11. The method of claim 1, wherein the traffic value of suppression point is an average maximum traffic value of the transmission network under the current running policy.

12. An electronic device, comprising: a memory, a processor, and a computer program stored in the memory and executable by the processor, wherein the computer program, when executed by the processor, causes the processor to perform a method for predicting traffic suppression comprising:

determining a traffic value of suppression point according to a preset network traffic model which represents a mapping relationship between a numerical value of a network parameter of a transmission network and a traffic value, wherein the traffic value of suppression point is a traffic threshold of the transmission network under a current running policy;

determining a suppression reference value of a target network parameter corresponding to the traffic value of suppression point;

acquiring a parameter prediction value corresponding to the target network parameter, and determining a traffic suppression prediction result according to the parameter prediction value and the suppression reference value;

acquiring a network parameter sample set from historical data of the transmission network, wherein the network parameter sample set comprises samples of the network parameter;

acquiring a preset acquisition granularity and a preset acquisition period, wherein the preset acquisition granularity represents frequency of acquiring the network parameter in one acquisition period;

acquiring network parameter samples from the historical data according to the acquisition granularity and the acquisition period;

performing data preprocessing on the acquired network parameter samples to obtain the network parameter sample set; and determining a root cause network parameter causing traffic suppression based on the traffic suppression prediction result.

13. A computer-readable storage medium, storing a computer-executable instruction which, when executed by a processor, causes the processor to perform a method for predicting traffic suppression comprising:

determining a traffic value of suppression point according to a preset network traffic model which represents a mapping relationship between a numerical value of a network parameter of a transmission network and a traffic value, wherein the traffic value of suppression point is a traffic threshold of the transmission network under a current running policy;

determining a suppression reference value of a target network parameter corresponding to the traffic value of suppression point;

acquiring a parameter prediction value corresponding to the target network parameter, and determining a traffic suppression prediction result according to the parameter prediction value and the suppression reference value;

acquiring a network parameter sample set from historical data of the transmission network, wherein the network parameter sample set comprises samples of the network parameter;

acquiring a preset acquisition granularity and a preset acquisition period, wherein the preset acquisition granularity represents frequency of acquiring the network parameter in one acquisition period;

acquiring network parameter samples from the historical data according to the acquisition granularity and the acquisition period;

performing data preprocessing on the acquired network parameter samples to obtain the network parameter sample set; and determining a root cause network parameter causing traffic suppression based on the traffic suppression prediction result.

14. The electronic device of claim 12, wherein before determining a traffic value of inhibition point according to a preset network traffic model, the method further comprises:

training the preset network traffic model according to the network parameter sample set.

15. The electronic device of claim 12, wherein after determining a traffic inhibition prediction result according to the parameter prediction value and the inhibition reference value, the method further comprises:

inputting the parameter prediction value to the preset network traffic model to obtain a traffic prediction value, in response to the traffic inhibition prediction result indicating that traffic inhibition occurs; and determining a traffic inhibition degree according to the traffic prediction value and the inhibition reference value.

16. The electronic device of claim 12, wherein the traffic value of inhibition point is an average maximum traffic value of the transmission network under the current running policy.

17. The non-transitory computer-readable storage medium of claim 13, wherein before determining a traffic value of inhibition point according to a preset network traffic model, the method further comprises:

training the preset network traffic model according to the network parameter sample set.

18. The non-transitory computer-readable storage medium of claim 13, wherein after determining a traffic inhibition prediction result according to the parameter prediction value and the inhibition reference value, the method further comprises:

inputting the parameter prediction value to the preset network traffic model to obtain a traffic prediction value, in response to the traffic inhibition prediction result indicating that traffic inhibition occurs; and determining a traffic inhibition degree according to the traffic prediction value and the inhibition reference value.

19. The non-transitory computer-readable storage medium of claim 13, wherein the traffic value of inhibition point is an average maximum traffic value of the transmission network under the current running policy.

* * * * *